(12) United States Patent
Salahuddeen et al.

(10) Patent No.: US 12,063,519 B2
(45) Date of Patent: Aug. 13, 2024

(54) FRONTHAUL INTERFACE FOR A CENTRALIZED RADIO ACCESS NETWORK

(71) Applicant: CommScope Technologies LLC, Hickory, NC (US)

(72) Inventors: Irfaan Ahamed Salahuddeen, Acton, MA (US); Arthur J. Barabell, Sudbury, MA (US)

(73) Assignee: CommScope Technologies LLC, Claremont, NC (US)

( * ) Notice: Subject to any disclaimer, the term of this patent is extended or adjusted under 35 U.S.C. 154(b) by 0 days.

(21) Appl. No.: 18/306,810

(22) Filed: Apr. 25, 2023

(65) Prior Publication Data

US 2023/0262475 A1    Aug. 17, 2023

Related U.S. Application Data

(63) Continuation of application No. 15/931,367, filed on May 13, 2020, now Pat. No. 11,671,840.

(60) Provisional application No. 62/847,794, filed on May 14, 2019.

(51) Int. Cl.
| | |
|---|---|
| *H04W 16/14* | (2009.01) |
| *H04W 74/08* | (2009.01) |
| *H04W 74/0808* | (2024.01) |
| *H04W 84/04* | (2009.01) |

(52) U.S. Cl.
CPC ....... *H04W 16/14* (2013.01); *H04W 74/0808* (2013.01); *H04W 84/042* (2013.01)

(58) Field of Classification Search
CPC ............. H04W 16/14; H04W 74/0808; H04W 84/042

USPC .......................................................... 370/328
See application file for complete search history.

(56) References Cited

U.S. PATENT DOCUMENTS

| | | |
|---|---|---|
| 9,125,054 B2 | 9/2015 | Ryan |
| 9,313,827 B2 | 4/2016 | Ilyadis |
| 9,380,466 B2 * | 6/2016 | Eyuboglu ........... H04L 12/4641 |
| 9,414,399 B2 | 8/2016 | Eyuboglu et al. |
| 9,794,791 B2 | 10/2017 | Hasarchi et al. |
| 9,867,052 B2 | 1/2018 | Sabat, Jr. et al. |

(Continued)

FOREIGN PATENT DOCUMENTS

| | | |
|---|---|---|
| EP | 3269118 A4 | 9/2018 |
| KR | 20110079872 A | 7/2011 |

(Continued)

OTHER PUBLICATIONS

ORAN-WG4.CUS.0-v01.00 (Year: 2019).*

(Continued)

*Primary Examiner* — Intekhaab A Siddiquee
(74) *Attorney, Agent, or Firm* — Fogg & Powers LLP

(57) ABSTRACT

One embodiment is directed to a system that is configured to communicate at least two different types of fronthaul data from a plurality of baseband units to a shared radio point using a single application-layer protocol that supports at least two types of elements. Each of the at least two types of elements is configured for a respective one of the at least two different types of fronthaul data. The system is configured so at least some of the elements communicated using the application-layer protocol include one or more sub-elements, where each sub-element comprises a type field, a length field, and a value portion.

24 Claims, 12 Drawing Sheets

(56) References Cited

U.S. PATENT DOCUMENTS

| | | | |
|---|---|---|---|
| 9,936,470 | B2 | 4/2018 | Eyuboglu et al. |
| 9,998,310 | B2 | 6/2018 | Barbieri et al. |
| 10,057,916 | B2 | 8/2018 | Barabell et al. |
| 10,080,215 | B2 * | 9/2018 | Chen .................... H04W 72/21 |
| 10,097,391 | B2 | 10/2018 | Fertonani et al. |
| 10,355,895 | B2 | 7/2019 | Barbieri et al. |
| 2014/0348181 | A1 | 11/2014 | Chandra et al. |
| 2016/0330736 | A1 | 11/2016 | Polehn et al. |
| 2017/0164336 | A1 | 6/2017 | Boldi et al. |
| 2017/0373890 | A1 | 12/2017 | Fertonani et al. |
| 2018/0007520 | A1 | 1/2018 | Gustafson et al. |
| 2018/0287696 | A1 | 10/2018 | Barbieri et al. |
| 2019/0007246 | A1 | 1/2019 | Fertonani et al. |
| 2019/0069278 | A1 | 2/2019 | Miyamoto et al. |
| 2019/0116568 | A1 | 4/2019 | Fertonani et al. |
| 2019/0208575 | A1 | 7/2019 | Barbieri et al. |
| 2020/0367062 | A1 | 11/2020 | Salahuddeen et al. |

FOREIGN PATENT DOCUMENTS

| | | | | |
|---|---|---|---|---|
| WO | 2014127054 | A1 | 8/2014 | |
| WO | 2015044871 | A1 | 4/2015 | |
| WO | 2016145371 | A2 | 9/2016 | |
| WO | WO-2016145371 | A2 * | 9/2016 | ........... H04B 1/1661 |
| WO | 2017070635 | A1 | 4/2017 | |
| WO | 2018017468 | A1 | 1/2018 | |
| WO | 2019027711 | A1 | 2/2019 | |

OTHER PUBLICATIONS

Anonymous, "xRAN Forum—Fronthaul Working Group", White Paper, Oct. 1, 2017, pp. 1-7, Retrieved on Oct. 9, 2019 from the Internet: URL: https://static1.squarespace.com/static/57e95f5abe65943a7a209f26/t/59dc290c017db28a6c9749fd/1507600654122/Xhttp:/www.xran.org/s/XRAN-Fronthaul-WorkingGroup-WP-171009.pdf.

Birring et al., "An Ethernet-Based Fronthaul Implementation with MAC/PHY Split LTE Processing", GLOBECOM 2017-2017 IEEE Global Communications Conference, Dec. 4, 2017, pp. 1-6.

eCPRI Specification V2.0, "Common Public Radio Interface: eCPRI Interface Specification", May 10, 2019, pp. 1-109.

European Patent Office, "Extended European Search Report", from EP Application No. 20805958.4, from Foreign Counterpart to U.S. Appl. No. 15/931,367, Mar. 7, 2023, pp. 1-15, Published: EP.

European Patent Office, "Partial Supplementary European Search Report" from EP Application No. 20805958.4, from Foreign Counterpart to U.S. Appl. No. 15/931,367, filed Oct. 28, 2022, pp. 1-14, Published: EP.

Garyantes et al., "xRAN Fronthaul Working Group Control, User and Synchronization Plane Specification", XRAN-FH.CUS.0-v01.00 Technical Specification, Revised Apr. 4, 2018, pp. 1-61.

Haberland et al., "Base Station in the Cloud", ITG Fachtagung Wien, Sep. 28, 2012, pp. 1-23, Alcatel-Lucent.

International Searching Authority, "International Preliminary Report on Patentability and Written Opinion from PCT Application No. PCT/US2020/032716 dated Nov. 25, 2021", from Foreign Counterpart to U.S. Appl. No. 15/931,367, pp. 1-15, Published: KR.

International Searching Authority, "International Search Report and Written Opinion from PCT Application No. PCT/US2020/032716", from Foreign Counterpart to U.S. Appl. No. 15/931,367, filed Aug. 26, 2020, pp. 1-19, Published: WO.

NGMN Alliance, "NGMN Overview on 5G RAN Functional Decomposition", vol. 802.1, No. V20 Feb. 24, 2018, pp. 1-47, Retrieved on Mar. 5, 2018 by EPO from URL: grouper.ieee.org/groups/802/1/files/public/docs2018/180226NGMN_RANFSX_D1_V20_Final.doc.

Oran Alliance, "O-RAN Fronthaul Working Group Control, User and Synchronization Plane Specification", ORAN-WG4.CUS.0-v02.00 Technical Specification, 2019, pp. 1-218, O-RAN Alliance.

U.S. Patent and Trademark Office, "Final Office Action", U.S. Appl. No. 15/931,367, filed Jun. 27, 2022, pp. 1-28, Published: US.

U.S. Patent and Trademark Office, "Notice of Allowance", U.S. Appl. No. 15/931,367, filed Jan. 26, 2023, pp. 1-8, Published: US.

U.S. Patent and Trademark Office, "Notice of Allowance", U.S. Appl. No. 15/931,367, filed Oct. 4, 2022, pp. 1-7, Published: US.

U.S. Patent and Trademark Office, "Office Action", U.S. Appl. No. 15/931,367, filed Feb. 9, 2022, pp. 1-36, Published: US.

Zhu et al., "Virtual Base Station Pool: Towards A Wireless Network Cloud for Radio Access Networks", CF' 10, May 2010, pp. 1-10, Bertinoro, Italy.

* cited by examiner

| FIELD | LENGTH (BYTES) | RANGE |
|---|---|---|
| TYPE 902 | 1 | |
| LENGTH 904 | 2 | |
| PDU INDEX/ SEQUENCE NO. 906 | 1 | 0-255 |
| RNTI 908 | 2 | 0-65535 |
| UE INDEX 910 | 1 | 0-255 |
| CARRIER NO 912 | 1 | DEFAULT: 0 MAX: 3 |
| PADDING 914 | 2 | |
| PDSCH-CONFIG-AND-FEC-BITS SUB-TLV 916 | VARIABLE | |
| PDSCH-PADDING AND-FEC-BITS SUB-TLV 918 | VARIABLE | |

FRONTHAUL INTERFACE FOR A CENTRALIZED RADIO ACCESS NETWORK

CROSS-REFERENCE TO RELATED APPLICATIONS

This application is a continuation of U.S. patent application Ser. No. 15/931,367, filed on May 13, 2020, which claims the benefit of U.S. Provisional Patent Application Ser. No. 62/847,794, filed on May 14, 2019, all of which are hereby incorporated herein by reference in their entirety.

BACKGROUND

A centralized radio access network (C-RAN) can be used to implement base station functionality for providing wireless service to various items of user equipment (UE). Typically, for each cell implemented by the C-RAN, one or more baseband units (BBUs) (also referred to here as "baseband controllers" or simply "controllers") interact with multiple remote units (also referred to here as "radio points" or "RPs").

In one common configuration, a controller is coupled to each radio point it serves over one or more synchronous point-to-point communication links. For example, each controller can be coupled to each radio point it serves over a pair of synchronous optical links that implement Common Public Radio Interface (CPRI) specification, one of which is used for communicating downlink front-haul data and the other of which is used for communicating uplink front-haul data.

In such a configuration, the controller performed all of the digital Layer-1, Layer-2, and Layer-3 processing for the air interface, while the radio points implement only the analog RF transceiver functions for the air interface. As a result, the downlink and uplink front-haul data that is communicated between the controller and each radio point over the CPRI links comprises in-phase and quadrature (IQ) data representing time-domain symbols for the air interface.

Deploying such special-purpose CPRI synchronous optical links, however, is typically more expensive and less convenient than using switched Ethernet networks to implement the fronthaul in a C-RAN.

SUMMARY

One embodiment is directed to a system to provide wireless service. The system comprises at least one controller and a plurality of radio points. Each of the radio points is associated with at least one antenna and remotely located from the controller. The plurality of radio points is communicatively coupled to the controller. The controller and the plurality of radio points are configured to implement at least one base station in order to provide wireless service via a wireless interface to a plurality of user equipment (UEs) using at least one cell. The controller is communicatively coupled to a core network of a wireless service provider. The system is configured so that physical layer processing for the wireless interface is split so that some of the physical layer processing is performed in the controller and some of the physical layer processing is performed in the radio points. The system is configured so that scrambling of first downlink data to be communicated to a UE over the wireless interface is performed in the controller and so that scrambling of second downlink data to be communicated to said UE over the wireless interface is performed in at least one of the radio points.

Another embodiment is directed to a system to provide wireless service. The system comprises at least one controller and a plurality of radio points. Each of the radio points is associated with at least one antenna and remotely located from the controller. The plurality of radio points is communicatively coupled to the controller. The controller and the plurality of radio points are configured to implement at least one base station in order to provide wireless service via a Long-Term Evolution (LTE) wireless interface to a plurality of user equipment (UEs) using at least one cell. The controller is communicatively coupled to a core network of a wireless service provider. The system is configured so that physical layer processing for the wireless interface is split so that some of the physical layer processing is performed in the controller and some of the physical layer processing is performed in the radio points. The system is configured so that signal generation and modulation for Primary Synchronization Signals (PSS) and Secondary Synchronization Signals (SSS) are performed entirely in the radio points and signal generation and modulation for Cell-Specific Reference Signals (CS-RSs) and Channel State Information Reference Signals (CSI-RSs) are performed entirely in the radio points. The system is configured so that, for a Physical Downlink Control Channel (PDCCH), downlink Layer-1 signal processing for the LTE wireless interface up to, and including, a scrambling function is performed in the controller. A portion of a resource element (RE) mapping function for the PDCCH is also performed in the controller. The downlink Layer-1 signal processing for the PDCCH not performed in the controller is performed in the radio points. The system is configured so that, for a Physical Downlink Shared Channel (PDSCH), downlink Layer-1 signal processing for the LTE wireless interface up to, and including, a scrambling function for data to be transmitted and generation of associated demodulation reference signals (DMRSs) are performed in the controller. The downlink Layer-1 signal processing for the PDSCH not performed in the controller is performed in the radio points.

Another embodiment is directed to a system to provide wireless service. The system comprises at least one controller and a plurality of radio points. Each of the radio points is associated with at least one antenna and remotely located from the controller. The plurality of radio points is communicatively coupled to the controller. The controller and the plurality of radio points are configured to implement at least one base station in order to provide wireless service via a Fifth Generation New Radio (5G-NR) wireless interface to a plurality of user equipment (UEs) using at least one cell. The controller is communicatively coupled to a core network of a wireless service provider. The system is configured so that physical layer processing for the wireless interface is split so that some of the physical layer processing is performed in the controller and some of the physical layer processing is performed in the radio points. The system is configured so that signal generation and modulation for Primary Synchronization Signals (PSS) and Secondary Synchronization Signals (SSS) are performed entirely in the radio points. The system is configured so that signal generation and modulation for Phase Tracking Reference Signals (PTRSs) and Channel State Information Reference Signals (CSI-RSs) are performed entirely in the radio points. The system is configured so that, for a Physical Downlink Control Channel (PDCCH), downlink Layer-1 signal processing for the 5G-NR wireless interface up to, and including, a scrambling function for data to be transmitted and generation of associated demodulation reference signals (DMRSs) are performed in the controller. A portion of a resource element (RE) mapping function for the PDCCH is also performed in the controller. The downlink Layer-1 signal processing for the PDCCH not performed in the controller is performed in the radio points. The system is configured so that, for a Physical Downlink Shared Channel (PDSCH), downlink Layer-1 signal processing for the 5G-NR wireless interface up to, and including, a scrambling function for data to be transmitted and generation of associated DMRSs are performed in the controller. The downlink Layer-1 signal processing for the PDSCH not performed in the controller is performed in the radio points.

Other embodiments are disclosed.

The details of various embodiments are set forth in the accompanying drawings and the description below. Other features and advantages will become apparent from the description, the drawings, and the claims.

BRIEF DESCRIPTION OF THE DRAWINGS

FIG. 9 illustrates one exemplary embodiment of a TLV element for communicating downlink IQ data over the fronthaul in a C-RAN.

Like reference numbers and designations in the various drawings indicate like elements.

DETAILED DESCRIPTION

Figure 1A:
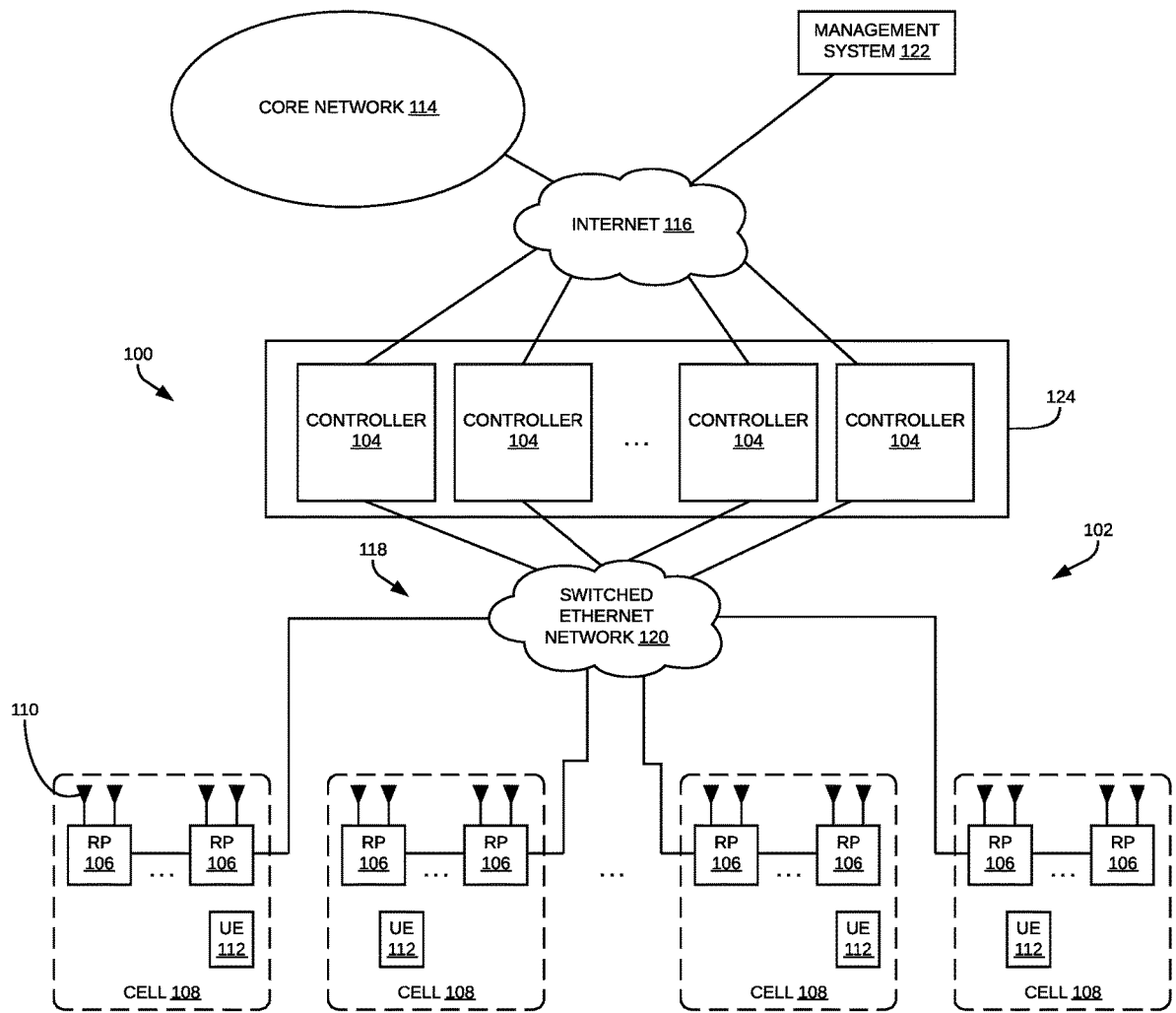
FIG. 1A is a block diagram illustrating one exemplary embodiment of a radio access network (RAN) system in which the multi-carrier radio points described here can be used.

FIG. 1A is a block diagram illustrating one exemplary embodiment of a radio access network (RAN) system 100 in which the multi-carrier radio points described here can be used. The system 100 is deployed at a site 102 to provide wireless coverage and capacity for one or more wireless network operators. The site 102 may be, for example, a building or campus or other grouping of buildings (used, for example, by one or more businesses, governments, or other enterprise entities) or some other public venue (such as a hotel, resort, amusement park, hospital, shopping center, airport, university campus, arena, or an outdoor area such as a ski area, stadium or a densely-populated downtown area).

In the exemplary embodiment shown in FIG. 1A, the system 100 is implemented at least in part using a C-RAN architecture that employs multiple baseband units 104 and multiple radio points (RPs) 106. The system 100 is also referred to here as a "C-RAN system" 100. Each RP 106 is remotely located from the baseband units 104. Also, in this exemplary embodiment, at least one of the RPs 106 is remotely located from at least one other RP 106. The baseband units 104 and RPs 106 serve at least one cell 108. The baseband units 104 are also referred to here as "baseband controllers" 104 or just "controllers" 104.

Each RP 106 includes or is coupled to one or more antennas 110 via which downlink RF signals are radiated to various items of user equipment (UE) 112 and via which uplink RF signals transmitted by UEs 112 are received.

Each controller 104 and RP 106 (and the functionality described as being included therein), as well as the system 100 more generally, and any of the specific features described here as being implemented by any of the foregoing, can be implemented in hardware, software, or combinations of hardware and software, and the various implementations (whether hardware, software, or combinations of hardware and software) can also be referred to generally as "circuitry" or a "circuit" configured to implement at least some of the associated functionality. When implemented in software, such software can be implemented in software or firmware executing on one or more suitable programmable processors. Such hardware or software (or portions thereof) can be implemented in other ways (for example, in a field programmable gate array (FPGA), application specific integrated circuit (ASIC), etc.). Also, the RF functionality can be implemented using one or more RF integrated circuits (RFICs) and/or discrete components. Each controller 104 and RP 106, and the system 100 more generally, can be implemented in other ways.

The system 100 is coupled to the core network 114 of each wireless network operator over an appropriate back-haul. In the exemplary embodiment shown in FIG. 1A, the Internet 116 is used for back-haul between the system 100 and each core network 114. However, it is to be understood that the back-haul can be implemented in other ways.

The exemplary embodiment of the system 100 shown in FIG. 1A is described here as being implemented as a Long Term Evolution (LTE) radio access network providing wireless service using an LTE air interface. LTE is a standard developed by 3GPP standards organization. In this embodiment, the controllers 104 and RPs 106 together are used to implement one or more LTE Evolved Node Bs (also referred to here as an "eNodeBs" or "eNBs") that are used to provide user equipment 112 with mobile access to the wireless network operator's core network 114 to enable the user equipment 112 to wirelessly communicate data and voice (using, for example, Voice over LTE (VoLTE) technology). These eNodeBs can be macro eNodeBs or home eNodeBs (HeNB).

Also, in this exemplary LTE embodiment, each core network 114 is implemented as an Evolved Packet Core (EPC) 114 comprising standard LTE EPC network elements such as, for example, a mobility management entity (MME) and a Serving Gateway (SGW) (all of which are not shown). Each controller 104 communicates with the MME and SGW in the EPC core network 114 using the LTE S1 interface. Also, each controller 104 communicates with other eNodeBs using the LTE X2 interface. For example, each controller 104 can communicate via the LTE X2 interface with an outdoor macro eNodeB (not shown) or another controller 104 in the same cluster 124 (described below) implementing a different cell 108.

If the eNodeB implemented using one or more controllers 104 is a home eNodeB, the core network 114 can also include a Home eNodeB Gateway (not shown) for aggregating traffic from multiple home eNodeBs.

The controllers 104 and the radio points 106 can be implemented so as to use an air interface that supports one or more of frequency-division duplexing (FDD) and/or time-division duplexing (TDD). Also, the controllers 104 and the radio points 106 can be implemented to use an air interface that supports one or more of the multiple-input-multiple-output (MIMO), single-input-single-output (SISO), single-input-multiple-output (SIMO), and/or beam forming schemes. For example, the controllers 104 and the radio points 106 can implement one or more of the LTE transmission modes using licensed and/or unlicensed RF bands or spectrum. Moreover, the controllers 104 and/or the radio points 106 can be configured to support multiple air interfaces and/or to support multiple wireless operators.

The controllers 104 are communicatively coupled to the radio points 106 using a front-haul network 118. In the exemplary embodiment shown in FIG. 1A, the front-haul 118 that communicatively couples each controller 104 to one or more RPs 106 is implemented using a standard switched Ethernet network 120. However, it is to be understood that the front-haul between the controllers 104 and RPs 106 can be implemented in other ways (for example, the front-haul between the controllers 104 and RPs 106 can be implemented using private networks and/or public networks such as the Internet).

In the exemplary embodiment shown in FIG. 1A, a management system 122 is communicatively coupled to the controllers 104 and RPs 106, for example, via the Internet 116 and Ethernet network 120 (in the case of the RPs 106).

In the exemplary embodiment shown in FIG. 1, the management system 122 communicates with the various elements of the system 100 using the Internet 116 and the Ethernet network 120. Also, in some implementations, the management system 122 sends and receives management communications to and from the controllers 104, each of which in turn forwards relevant management communications to and from the RPs 106. The management system 122 can comprise a proprietary management system provided by the vendor of the C-RAN system 100 or a Home eNodeB management system (HeNB MS) (or other eNodeB management system) used by an operator to manage Home eNodeBs (or other eNodeBs) deployed in its network.

Each controller 104 can also implement a management interface by which a user is able to directly interact with the controller 104. This management interface can be implemented in various ways including, for example, by implementing a web server that serves web pages that implement a web-based graphical user interface for a user to interact with the controller 104 using a web browser and/or by implementing a command-line interface by which a user is able to interact with the controller 104, for example, using secure shell (SSH) software.

In the exemplary embodiment shown in FIG. 1A, the system 100 comprises multiple controllers 104 that are grouped together into a cluster 124. Each cluster 124 is used to serve a set of cells 108, where each cell 108 has an associated set of RPs 106 that have been assigned to that cell 108 and that are served by one or more of the controllers 104 included in that cluster 124. The association of radio points 106 with cells 108 is implemented using a "white list" that associates a radio point identifier (for example, a media access control (MAC) address) with an identifier associated with an associated cell 108 (for example, a logical or virtual cell identifier used within the context of the C-RAN 100).

Figure 1B:
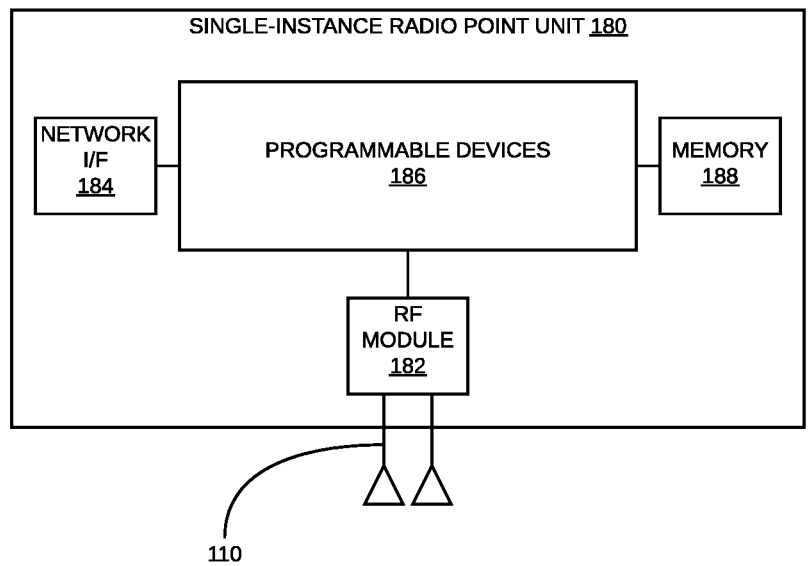
FIG. 1B is a block diagram illustrating one exemplary embodiment of a single-instance radio point unit that can be used to implement a single instance of a radio point of the C-RAN of FIG. 1A.
Figure 1C:
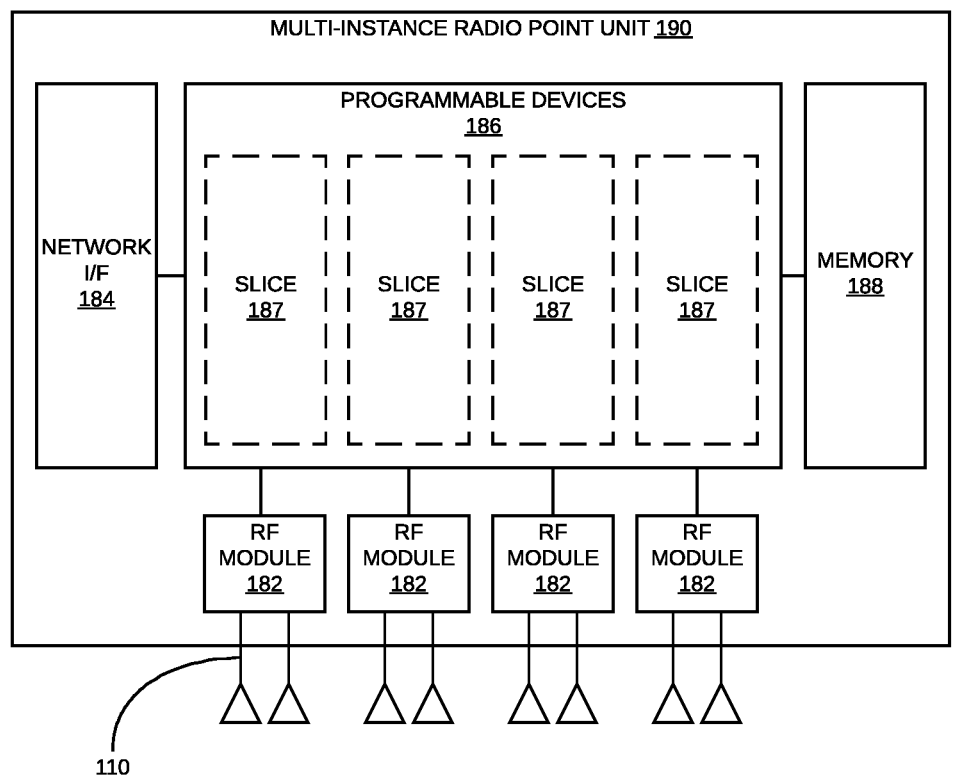
FIG. 1C is a block diagram illustrating one exemplary embodiment of a multiple-instance radio point unit that can be used to implement one or more instances of a radio point for one or more C-RANs of the type shown in FIG. 1A.

In the example described here in connection with FIG. 1A, each radio point 106 can be implemented using a single-instance radio point unit 180 as shown in FIG. 1B or as a multiple-instance radio point unit 190 as shown in FIG. 1C.

FIG. 1B is a block diagram illustrating one exemplary embodiment of a single-instance radio point unit 180 that can be used to implement a single instance of a radio point 106 of the C-RAN 100 of FIG. 1A.

In this exemplary embodiment, the single-instance radio point unit 180 comprises a single radio frequency (RF) module 182. The RF module 182 comprises circuitry that implements the RF transceiver functions for a single instance of a radio point 106 and provides an interface to one or more antennas 110 associated with that instance of the radio point 106. More specifically, in the exemplary embodiment shown in FIG. 1B, each RF module interfaces 182 with a respective two antennas 110.

Each RF module 182 comprise circuitry that implements, for the associated instance of a radio point 106, two downlink signal paths, one for each of the two antennas 110, and two uplink signals paths, one for each of the two antennas 110. In one exemplary implementation, each downlink signal path comprises a respective digital-to-analog converter (DAC) to convert downlink digital samples to a downlink analog signal, a respective frequency converter to upconvert the downlink analog to a downlink analog RF signal at the desired RF frequency, and a respective power amplifier (PA) to amplify the downlink analog RF signal to the desired output power for output via the antenna 110 associated with that downlink signal path. In one exemplary implementation, each uplink signal path comprises a respective low-noise amplifier (LNA) for amplifying an uplink analog RF signal received via the antenna 110 associated with the uplink signal path, a respective frequency converter to down-convert the received uplink analog RF signal to an uplink analog baseband frequency signal, a respective analog-to-digital converter (ADC) to convert the uplink analog baseband frequency signal to uplink digital samples. Each of the downlink and uplink signal paths can also include other conventional elements such as filters. Each RF module can be implemented using one or more RF integrated circuits (RFICs) and/or discrete components.

The single-instance radio point unit 180 further comprises at least one network interface 184 that is configured to communicatively couple the single-instance radio point unit 180 to the front-haul network 118. More specifically, in the exemplary embodiment shown in FIG. 1B, the network interface comprises an Ethernet network interface that is configured to communicatively couple that single-instance radio point unit 180 to the switched Ethernet network 120 that is used to implement the front-haul 118 for the C-RAN 100.

The single-instance radio point unit 180 further comprises one or more programmable devices 186 that execute, or are otherwise programmed or configured by, software, firmware, or configuration logic in order to implement Layer-1 (physical layer) baseband processing described here as being performed by the instance of a radio point 106 implemented using that single-instance radio point unit 180. The one or more programmable devices 186 can be implemented in various ways (for example, using programmable processors (such as microprocessors, co-processors, and processor cores integrated into other programmable devices), programmable logic (such as field programmable gate arrays (FPGA), and system-on-chip packages)). Where multiple programmable devices are used, all of the programmable devices do not need to be implemented in the same way. In the exemplary embodiment shown in FIG. 1B, memory 188 included in the radio point unit 180 is used by the programmable devices 186. Memory 188 can comprise memory that is integrated into and/or that is external to the programmable devices 186 (as illustrated in FIG. 1B).

Figure 10:
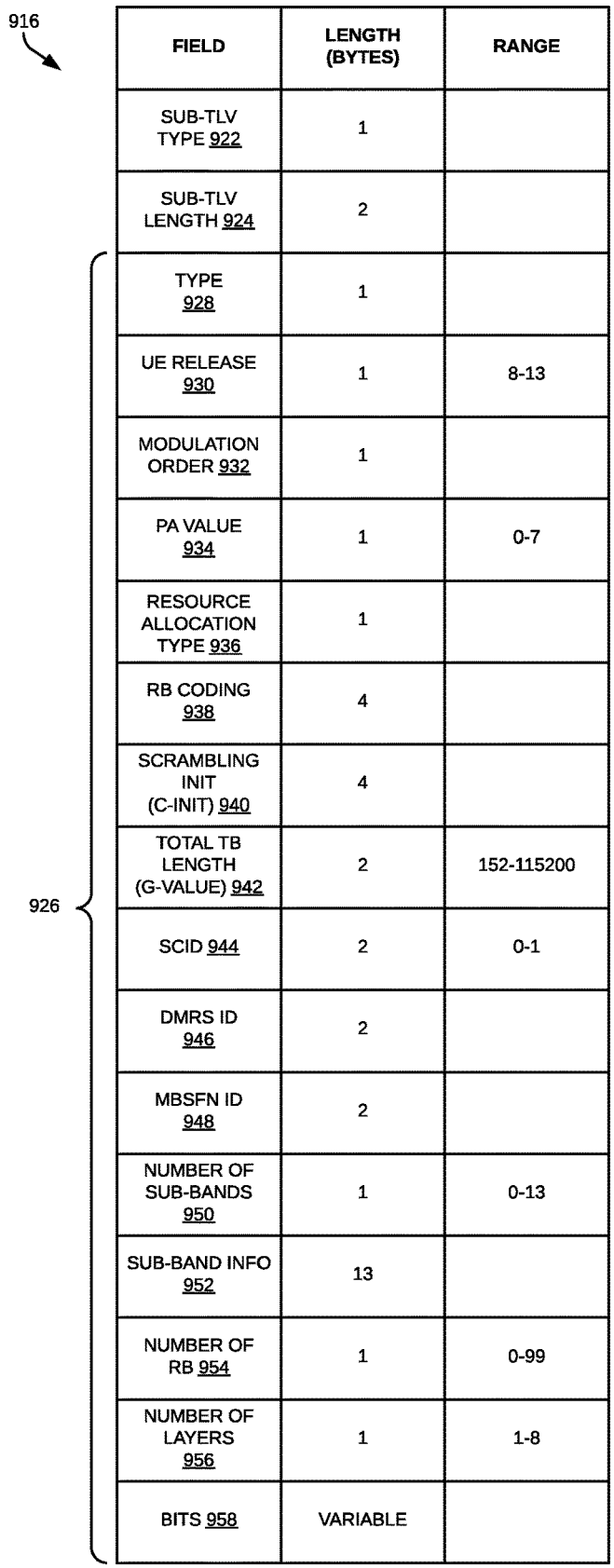
FIG. 10 illustrates one exemplary embodiment of a PDSCH-CONFIG-and-FEC-BITS sub-TLV element.

FIG. 10 is a block diagram illustrating one exemplary embodiment of a multiple-instance radio point unit 190 that can be used to implement one or more instances of a radio point 106 for one or more C-RANs 100 of the type shown in FIG. 1A.

In this exemplary embodiment, the multiple-instance radio point unit 190 comprises multiple RF modules 182. In general, each RF module 182 is implemented as described above in connection with FIG. 1B, except that the multiple radio point unit 190 includes multiple RF modules 182 instead of a single RF module 182. In one implementation of the embodiment shown in FIG. 10, one RF module 182 is used for each instance of a radio point 106 that is implemented using the multiple-instance radio point unit 190.

The multiple-instance radio point unit 190 further comprises at least one network interface 184 that is configured to communicatively couple the multiple-instance radio point unit 190 to the fronthaul network 118 of each C-RAN 100 with which the unit 190 is being used. In general, each RF module 182 is implemented as described above in connection with FIG. 1B.

The multiple-instance radio point unit 190 further comprises one or more programmable devices 186 and memory 188. In general, the one or more programmable devices 186 and memory 188 included in the multiple-instance radio point unit 190 are implemented as described above in connection with FIG. 1B, except that the programmable devices 186 and memory 188 are scaled so as to be able implement multiple instances of a radio point 106 instead of only a single instance of a radio point 106, as is the case with the single-instance radio point unit 180 of FIG. 1B.

In the exemplary embodiment shown in FIG. 10, each of the multiple instances of a radio point 106 implemented using the multiple-instance radio point unit 190 can be implemented using a separate "slice" 187 of the programmable devices 186 that are dedicated to implementing that radio point instance. However, in order to support efficient implementation of, and communications between, radio points instances implemented on the same multiple-instance radio point unit 190, the multiple-instance radio point unit 190 can be configured so that at least some of the resources of the multiple-instance radio point unit 190 (for example, resources provided by the programmable devices 186 or memory 188) are shared among the slices 187 used to implement the various radio instances. In one example, the various radio point instances implemented by a single multiple-instance radio point unit 190 use shared memory 188 to communicate with each other using internal messaging (via the shared memory 188), thereby avoiding the need for such communications to occur over the fronthaul network 118.

The multiple-instance radio point unit 190 is configured to implement multiple instances of a radio point 106, where each such radio point instance appears to the associated serving controller 104 as a separate logical radio point 106. Each instance of a radio point 106 is implemented using one or more RF modules 182 and one or more slices 187 of the programmable devices 186. For example, in the embodiment shown in FIG. 10, a 2×2 MIMO instance of a radio point 106 can be implemented using a single RF module 182 and a single slice 187 of the programmable devices 186, whereas a 4×4 MIMO instance of a radio point 106 can be implemented using two RF modules 182 and two slices 187 of the programmable devices 186. Other examples and embodiments can be implemented in other ways.

Generally, for each cell 108 implemented by the C-RAN 100, the corresponding controller 104 performs the Layer-3 and Layer-2 processing for the wireless interface as well as at least some of the Layer-1 (physical layer) processing for the wireless interface, where each of the radio points 106 serving that cell 108 performs the Layer-1 processing not performed by the controller 104 as well as implementing the analog RF transceiver functions.

Different splits in the wireless-interface processing between the controller 104 and the radio points 106 can be used for each of the physical channels of the wireless interface. That is, the split in the wireless-interface processing between each controller 104 and the radio points 106 used for one or more downlink physical channels of the wireless interface can differ from the split used for one or more uplink physical channels of the wireless interface. Also, for a given direction (downlink or uplink), the same split in the wireless-interface processing does not need to be used for all physical channels of the wireless interface associated with that direction.

Appropriate fronthaul data is communicated between the controller 104 and the associated radio points 106 over the front-haul 118 in order to support each split that is used. In the following description, the fronthaul data communicated between the controllers 104 and the radio points 106 for the air interface is generally referred to here as "IQ data" even though such fronthaul data can take many forms, including forms that are not IQ data.

Figure 2:
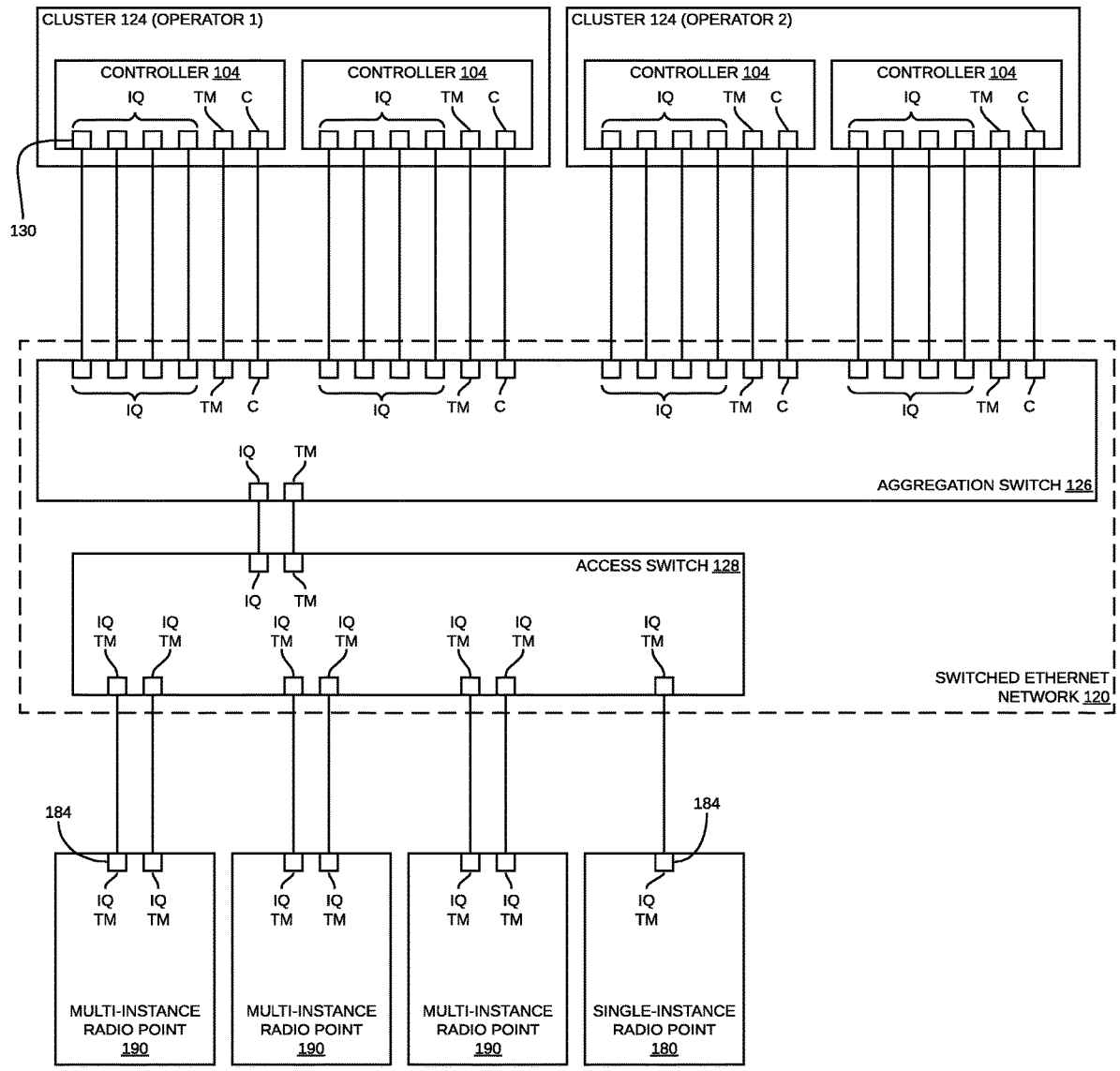
FIG. 2 illustrates additional details about implementing the fronthaul for the C-RAN using a switched Ethernet network.

FIG. 2 illustrates additional details about implementing the fronthaul 118 for the C-RAN 100 using a switched Ethernet network 120. In general, the switched Ethernet network 120 comprises one or more Ethernet switches. In the example shown in FIG. 2, the switched Ethernet network 120 comprises an aggregation layer including one or more aggregation Ethernet switches 126 and an access layer including one or more access Ethernet switches 128. Although only one aggregation switch 126 and access Ethernet switch 128 is shown in FIG. 2 for ease of illustration, other numbers of switches 126 and 128 can be used. Also, other Ethernet network topologies can be used (for example, there may be additional layers (or hops) of Ethernet switches between (or within one or more of) the aggregation layer and the access layer or entirely different topologies can be used).

As illustrated in more detail in FIG. 2, in this exemplary embodiment, the controllers 104 and radio points 106 communicate with each other over the switched Ethernet network 120 used to implement the fronthaul 118 using two common virtual local area networks (VLANs). In this embodiment, one VLAN is used for communicating timing information (for example, Institute of Electrical and Electronics Engineers (IEEE) 1588 Precision Time Protocol (PTP) messages used for synchronizing the controllers 104 and RPs 106) and management information (for example, Simple Object Access Protocol (SOAP) and eXtensible Markup Language (XML) messages) between the controllers 104 and the radio points 106. This VLAN is referred to here as the "timing and management" or "TM" VLAN. A second VLAN is used for communicating IQ data between the controllers 104 and the radio points 106 and is referred to here as the "IQ" VLAN.

In this embodiment, the TM and IQ VLANs are configured so that all of the controllers 104 in a cluster 124 and the associated RPs 106 are members of the TM and IQ VLANs.

In the example shown in FIG. 2, the fronthaul 118 is used for fronthauling data for two clusters 124 serving two respective wireless operators. In this example, a separate VLAN is established for each cluster 124 for inter-controller communications between the controllers 104 included that cluster 124. Each such VLAN is referred here as a "cluster" or "C" VLAN.

In the example shown in FIG. 2, each controller 104 includes multiple Ethernet network interfaces 130 for coupling that controller 104 to the switched Ethernet network 120 (more specifically, to one or more aggregation switches 126 in the example shown in FIG. 2).

In the example shown in FIG. 2, some of the Ethernet network interfaces 130 in each controller 104 are dedicated for communicating timing and management data over the timing and management VLAN. Each such Ethernet network interface 130 is also referred to here as a "timing and management" or "TM" Ethernet network interface 130. In this example, some of the Ethernet network interfaces 130 in each controller 104 are dedicated for communicating IQ data over the IQ VLAN and are also referred to here as "IQ" Ethernet network interfaces 130. Also, in this example, some of the Ethernet network interfaces 130 in each controller 104 are dedicated for communicating over the cluster VLAN. Each such Ethernet network interface 130 is referred to here as a "cluster" or "C" Ethernet network interface 130. Each controller 104 also includes one or more other Ethernet network interfaces (not shown) that are used for communicating over the backhaul with the core network 114.

In the example shown in FIG. 2, each single-instance radio point unit 180 comprises one Ethernet network interface 184 and each multiple-instance radio point 190 comprises two Ethernet network interfaces 184, where each such Ethernet network interface 184 is used for communicating over both the timing and management VLAN and the IQ VLAN.

In this embodiment, for each cell 108 served by a cluster 124, the controller 104 serving that cell 108 transmits timing messages over the timing VLAN by multicasting the timing messages using a respective timing multicast group defined for that cell 108. That is, each cell 108 served by the cluster 124 has a single timing multicast group assigned to it. In this embodiment, for each cell 108 served by a cluster 124, the RPs 106 transmit timing messages over the timing and management VLAN by unicasting the messages to the IP address assigned to the Timing and Management Ethernet interface of the serving controller 104 for that cell 108.

Also, in this embodiment, for each cell 108 served by a cluster 124, management messages are transmitted between the controllers 104 and the RPs 106 over the timing and management VLAN by unicasting the messages using the IP address assigned to the Timing and Management Ethernet interface of the controller 104 or to an Ethernet interface 184 of the RP 106 to which the message is sent.

A set of downlink and uplink IP multicast groups are used for transmitting downlink and uplink IQ data, respectively.

The timing, management, and IQ data can be communicated in other ways.

In general, when each radio point 106 boots up, each radio point instance implemented by that radio point 106 will use a discovery protocol in order to discover the controller 104 that radio point instance should be homed to. As a part of the discovery process, the radio point instance will be provided with the IP address assigned to the Timing and Management Ethernet interface 130 of the discovered controller 104. The radio point instance uses that IP address to establish a SOAP (management) connection with the controller 104. The controller 104 communicates the IP addresses of the downlink and uplink IP multicast groups that the radio point instance should use for communicating downlink and uplink IQ data.

In configurations where multiple controllers 104 serve a given radio point instance (for example, where a controller 104 serves as backup controller for another primary controller 104 or where carrier aggregation is used and multiple controllers 104 are used to perform the baseband processing for the multiple carriers), each radio point instance serving a given cell 108 still registers to the appropriate downlink IP multicast groups for the cell 108 and sends data to the controllers 104 over the front-haul 118 using the appropriate uplink IP multicast groups. Because IP multicast is used, multiple controllers 104 can register to, and receive data using, the same uplink IP multicast groups that the radio point instances for that cell 108 use to send data over the front-haul 118 and multiple controllers 104 can send data over the front-haul 118 to the radio point instances for that cell 108 using the downlink IP multicast groups that those radio point instances register to. That is, the radio point instances can be transparently served by multiple controllers 104 because of the use of IP multicast.

Moreover, the use of IP multicast does not preclude a single controller 104 serving multiple cells 108. In configurations where a single controller 104 serves multiple cells 108 (for example, a primary cell 108 and a secondary cell 108), that single controller 104 registers to the uplink IP multicast groups for the primary cell 108 and secondary cell 108 and sends data to the appropriate radio point instances over the front-haul 118 using the downlink IP multicast cast groups for the primary cell 108 and secondary cell 108.

In this exemplary embodiment, downlink and uplink IQ data is transmitted between each controller 104 and the associated radio points 106 on a UE-by-UE basis. For each UE 112 that is served by the cell 108, the serving controller 104 assigns a subset of that cell's RPs 106 to that UE 112 for downlink wireless transmissions to that UE 112. This subset of RPs 106 is referred to here as the "simulcast zone" for that UE 112. The simulcast zone for each UE 112 is determined based on receive power measurements made at each of the RPs 106 for certain uplink transmissions from the UE 112 (for example, LTE Physical Random Access Channel (PRACH) and Sounding Reference Signals (SRS) transmissions) and is updated as the UE 112 moves throughout the cell 108.

For the uplink, in this embodiment, for each cell 108, the radio points 106 serving that cell 108 transmit uplink IQ data to the serving controller 104 using a set of uplink IP multicast groups and multicast load balancing. In this embodiment, multiple link aggregation groups (LAGs) are defined for each cell 108, with each LAG having an uplink IP multicast group associated with it. The switches 126 and 128 in the switched Ethernet network 120 are configured to use multicast load balancing to load balance the uplink IQ data traffic across the various IQ Ethernet interfaces of the serving controller 104.

As with the uplink, multiple downlink IP multicast groups are used for load balancing purposes. For the downlink, multiple sets of downlink IP multicast groups are used for sending downlink IQ data to different combinations of RPs 106, where the sets of downlink IP multicast groups are dynamic. For one set of downlink IP multicast groups, each of the downlink IP multicast groups of that set include all of the RPs 106 serving the cell 108. These "all RP" downlink IP multicast groups are used in order to transmit downlink IQ data for common logical channels of the wireless interface to all of the RPs 106 of the cell 108. One example of where this may be done is for transmitting downlink IQ data for LTE System Information Blocks (SIBs). An "all RP" downlink IP multicast group can also be used in the event that there is no other suitable set of downlink IP multicast groups. For the other sets of downlink IP multicast groups, all of the constituent downlink IP multicast groups contain less than all of the RPs 106 serving the cell 108. These other sets of downlink IP multicast groups are created as needed in order to communicate downlink IQ data (in particular, downlink IQ data for the Physical Downlink Shared Channel (PDSCH)) to only those RPs 106 that are in the simulcast zone for a given UE 112.

When downlink data needs to be transmitted to a given UE 112 over the wireless interface, if there is an existing set of downlink IP multicast groups that "matches" the simulcast zone for that UE 112, then one of the downlink IP multicast groups from the matching set is used for transmitting downlink IQ data for that UE 112 to the RPs 106 in that UE's simulcast zone. If there is no set of downlink IP multicast groups that matches the simulcast zone of a given UE 112, a new set of downlink IP multicast groups can be created, where all of the downlink IP multicast groups of that set include the RPs 106 in that simulcast zone and then one of those newly created downlink IP multicast groups is used for transmitting downlink IQ data to only those RPs 106 in that simulcast zone. If it is not possible to create a new matching set of downlink IP multicast groups (for example, because the maximum number of downlink IP multicast groups has already been created and none of the existing downlink IP multicast group sets can be purged at that time due to non-use), then one of the previously mentioned "all RP" downlink IP multicast groups can be used.

However, using an "all RP" downlink IP multicast group may result in downlink IQ data for a given UE 112 being sent to RPs 106 that are not included in that UE's simulcast zone. To deal with this, an application-layer multicast address included in the IQ data (as described below) is used in this example to identify which RPs 106 the associated downlink IQ data is actually intended for. In this example, this application-layer multicast address comprises an address field that can be viewed as a plurality of bit positions. A respective one of the bit positions is assigned to each RP 106 serving the cell 108, where that bit position is set (that is, stores a first binary value (for example, one)) if the associated downlink IQ data is intended for the associated RP 106 and where that bit positioned is cleared (that is, stores a second binary value (for example, zero)) if the associated downlink IQ data is not intended for the associated RP 106. For example, all of the bit positions of the application-layer multicast address would be set for packets including downlink IQ data for common messages (such as SIBs), which are intended for all RPs 106. For downlink IQ data intended for a UE 112 that includes less than all of the RPs 106 in its simulcast zone, only the bit positions of the application-layer multicast address that correspond to RPs 106 in that simulcast zone are set, with the bit positions that correspond to all other RPs 106 being cleared. (One example of an application-layer multicast address is the application-layer multicast address field 526 described below in connection with FIG. 5.)

Figure 3:
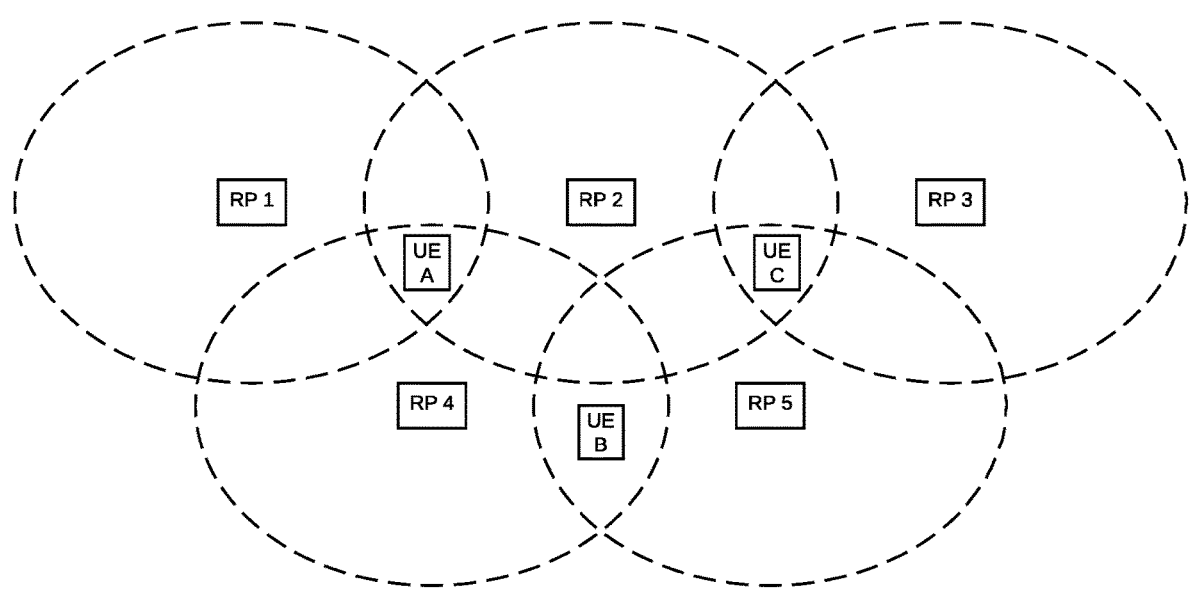
FIG. 3 illustrates one example of how the IP and application-layer multicast groups can be used to communicate downlink IQ data over the switched Ethernet network from the serving controller to the radio points.

FIG. 3 illustrates one example of how the IP and application-layer multicast groups can be used to communicate downlink IQ data over the switched Ethernet network 120 from the serving controller 104 to the radio points 106. In the example shown in FIG. 3, five RPs 106 and three UEs 112 are shown. The RPs 106 are individually referenced in FIG. 3 as RP 1, RP 2, RP 3, RP 4, and RP 5, respectively. The UEs 112 are individually referenced in FIG. 3 as UE A, UE B, UE C, respectively. In the example, shown in FIG. 3, the simulcast zone for UE A includes RP 1, RP 2, and RP 4, the simulcast zone for UE B includes RP 4 RP 5, and UE C includes RP 2, RP 3, and RP 5. If UE A, UE B, and UE C all remain in the same location and continue to access the cell 108, three downlink IP multicast groups will be formed (if they do not already exist). These three downlink IP multicast groups include a first downlink IP multicast group including RP 1, RP 2, and RP 4 (and, in this example, is assigned an IP address of 239.2.1.10), a second downlink IP multicast group including RP 4 and RP 5 (and, in this example, is assigned an IP address of 239.2.1.11), and a third downlink IP multicast group including RP 2, RP 3, and RP 5 (and, in this example, is assigned an IP address of 239.2.1.12). However, it may take time for those "matching" downlink IP multicast groups to all be formed.

For example, when UE A first accesses the cell 108 and a downlink IP multicast group including RP 1, RP 2, and RP 4 has not yet been created, downlink IQ data can be sent to the RPs in the simulcast zone for UE A (that is, to RP 1, RP 2, and RP 4) using the "all RP" downlink IP multicast group (which in this example is assigned an IP address of 239.2.1.1). In this case, as shown in FIG. 3, packets including downlink IQ data intended for the RPs in the simulcast zone for UE A are sent to the "all RP" downlink IP multicast group (using the corresponding IP address of 239.2.1.1), with an application-layer multicast address of "11010" where the first bit position (corresponding to RP 1), the second bit position (corresponding to RP 2) and the fourth bit position (corresponding to RP 4) are set and the third bit position (corresponding to RP 3) and the fifth bit position (corresponding to RP 5) are cleared. In this example, only five bit positions are shown for ease of illustration though the application-layer multicast address typically would use a larger number of bit positions (for example, 64 bit positions, which corresponds to an eight-byte address).

After the downlink IP multicast group including RP 1, RP 2, and RP 4 is created, packets including downlink IQ data intended for the RPs in the simulcast zone for UE A are sent to that downlink IP multicast group (using the corresponding IP address of 239.2.1.10), with the same application-layer multicast address of "11010."

Also, in this example, packets including downlink IQ data for common messages (such as SIBs) are sent to the "all RP" downlink IP multicast group (using the corresponding IP address of 239.2.1.1), with an application-layer multicast address of "11111" (because the data is intended for all RPs).

Figure 4:
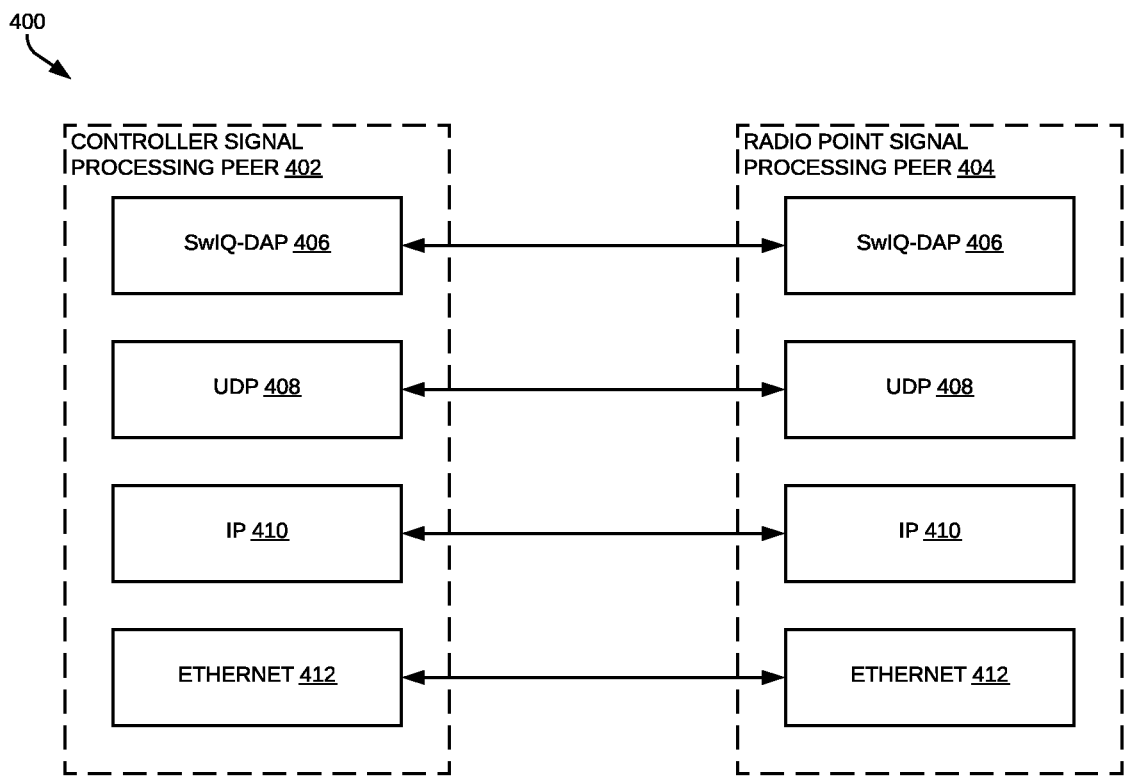
FIG. 4 is a diagram illustrating one exemplary embodiment of a protocol stack suitable for communicating IQ data between each controller and the associated radio points over the front-haul.

FIG. 4 is a diagram illustrating one exemplary embodiment of a protocol stack 400 suitable for communicating IQ data between each controller 104 and the associated radio points 106 over the front-haul 118. The controller 104 and each associated radio point 106 implements a respective signal processing peer entity 402 and 404, respectively, that implements the protocol stack 400.

As shown in FIG. 4, the highest layer of the protocol stack 400 comprises the application layer protocol 406 that is used for communicating IQ data over the fronthaul 118 between the controller 104 and each radio point 106. As noted above, the IQ data communicated over the fronthaul 118 is used in the digital signal processing that is performed in order to implement the wireless interface for the cell 108.

Figure 5:
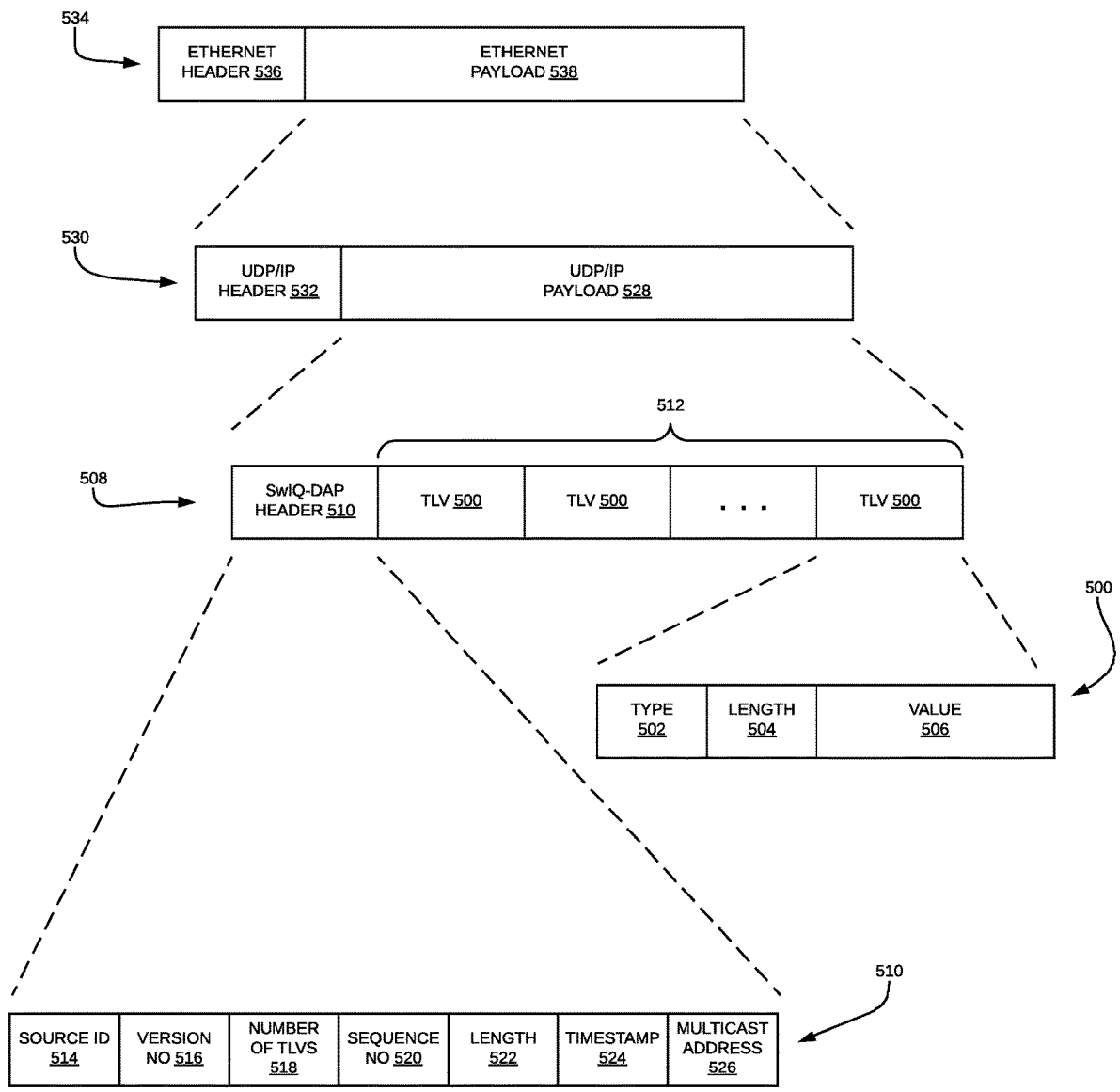
FIG. 5 illustrates one example of a Type-Length-Value (TLV) element.

In this example, the application layer protocol 406 is also referred to here as the "Switched IQ DSP Application Protocol" or "SwIQ-DAP" layer 406. Because many different types of IQ data can be communicated between the controller 104 and each radio point 106 over the fronthaul 118, the IQ data is communicated using Type-Length-Value (TLV) elements 500, which are illustrated in FIG. 5. Each TLV element 500 comprises a type field 502 that identifies what type and format of IQ data is contained in that element 500, a length field 504 that identifies how long that element 500 is, and a value field 506 that contains the data or payload for that element 500. The type field 502 and length field 504 have a fixed length, whereas the length of the value field 506 can vary.

In this example, as shown in FIG. 5, one or more TLV elements 500 are combined together into a single SwIQ-DAP protocol data unit (PDU) 508. Each such SwIQ-DAP PDU 508 includes a header 510 and a payload 512 comprising one or more TLV elements 500 (the number of which depends on the maximum transmission unit (MTU) size specified for the SwIQ-DAP PDUs 508). In this example, the SwIQ-DAP header 510 comprises a source identifier field 514 that is used to identify the sender of the PDU 508. In one embodiment where there is only one controller 104 that serves each cell 108, the source identifier field 514 is only used to for uplink data in order to identify which RP 106 has sent a SwIQ-DAP PDU 508 to that one controller 104 (since multiple RPs 106 can send such PDUs 508 to the controller 104) but is left undefined for downlink SwIQ-DAP PDUs 508 that are sent from the controller 104 (since there is only one controller 104 that serves the cell 108). In another embodiment where multiple controllers 104 serve each cell 108, the source identifier field 514 is used both to identify which RP 106 has sent each uplink SwIQ-DAP PDU 508 to the controllers 104 and to identify which controller 104 has sent each downlink SwIQ-DAP PDU 508 to one or more RPs 106.

In this example, the SwIQ-DAP header 510 also comprises a version number field 516 that identifies the version number for the SwIQ-DAP, a number of TLVs field 518 that specifies the number of TLV elements 500 that are included in that PDU 508, a sequence number 520 that specifies a transmission sequence number for that PDU 508, a length field 522 that specifies the length of that PDU 508, and a timestamp field 524 that contains a time stamp specifying when that PDU 508 was sent. In this example, the SwIQ-DAP header 510 also comprises an application-layer multicast address field 526 that can be used to specify a multicast group of radio points 106 at the application layer level. This can be done as described above in connection with FIG. 3, where each bit position of the application-layer multicast address field 526 is associated with a respective radio point 106, where that bit position is set if the associated downlink IQ data is intended for that radio point 106 and where that bit positioned is cleared if the associated downlink IQ data is not intended for that radio point 106.

As shown in FIG. 4, the next layers of the protocol stack 400 comprises the User Datagram Protocol (UDP) layer 408 and the Internet Protocol (IP) layer 410 via which UDP datagrams encapsulated in IP packets are communicated between the controller 104 and the radio points 106. As shown in FIG. 5, each SwIQ-DAP PDU 508 is transmitted as a UDP datagram that is encapsulated in the payload 528 of an IP packet 530. Each IP packet 530 also includes a header 532 including the standard IP and UDP header information.

As noted above, the fronthaul 118 is implemented using a standard switched Ethernet network 120. Therefore, the lowest layer (data link layer) of the protocol stack 400 is an Ethernet layer 412 (shown in FIG. 4) via which Ethernet frames 534 (shown in FIG. 5) are communicated over the Ethernet network 120 between the controller 104 and the radio points 106. As shown in FIG. 5, each Ethernet frame 534 includes a standard Ethernet header 536 and a payload 538. One or more IP packets 530 are encapsulated in the payload 538 of each Ethernet frame 534.

The protocol stack 400 is configured so that IQ fronthaul data can be communicated over the fronthaul 118 of a C-RAN 100 using a standard switched Ethernet network 120 (instead of conventional synchronous CPRI point-to-point links). Various standard features provided by the UDP, IP, and Ethernet layers 408, 410, and 412 (for example, port numbers, IP multicast groups, VLANs, and packet tagging) can be used to help satisfy the requirements for the fronthaul 118 while additional features implemented in the application layer 402 are used where needed.

Figure 6:
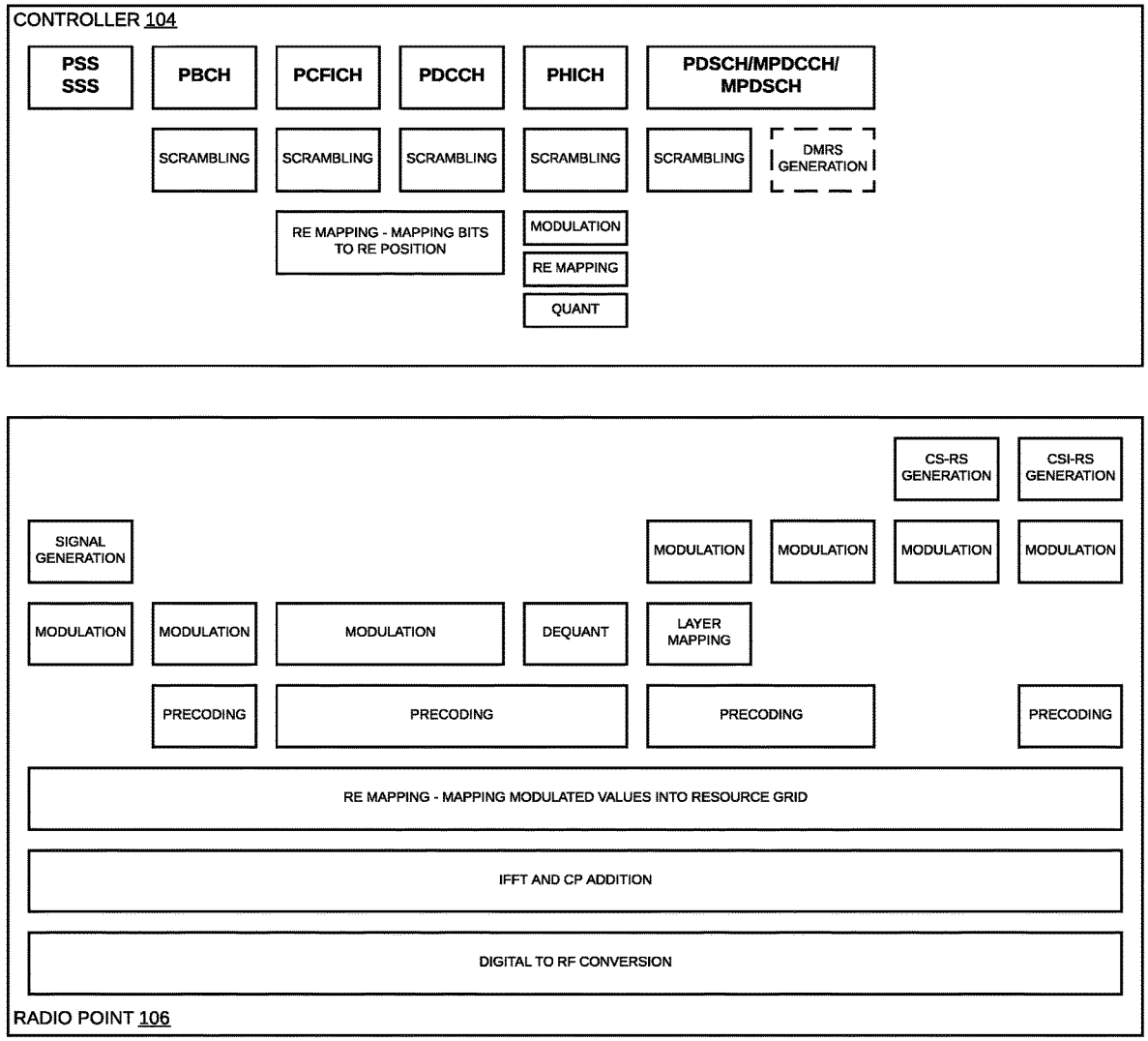
FIG. 6 illustrates one example of the different splits in the wireless-interface processing between the controller and the radio points that can be used for the various downlink channels provided via an LTE wireless interface.

As noted above, different splits in the wireless-interface processing between the controller 104 and the radio points 106 can be used for each of the physical channels of the wireless interface. FIG. 6 illustrates one example of the different splits in the wireless-interface processing between the controller 104 and the radio points 106 that can be used for the various downlink channels provided via an LTE wireless interface. In the example shown in FIG. 6, the serving controller 104 performs the Layer-3 (L3) and Layer-2 (L2) processing for the LTE wireless interface, whereas different splits in the Layer-1 (physical layer) processing for the wireless interface are used for the different LTE downlink channels.

In the example shown in FIG. 6, downlink Layer-1 signal generation and modulation for the Primary Synchronization Signals (PSS) and Secondary Synchronization Signals (SSS) are performed entirely in the radio points 106. Likewise, in the example shown in FIG. 6, downlink Layer-1 signal generation and modulation for the Cell-Specific Reference Signals (CS-RSs) and Channel State Information Reference Signals (CSI-RSs) are performed entirely in the radio points 106. By generating these signals in each radio point 106, in the event that downlink IQ data for one or more of the downlink channels is corrupted or missing, the radio point 106 can continue to send these synchronization and reference signals. By doing this, the UEs 112 can continue to remain synchronized to the cell 108 and provide channel quality information (CQI). Also, generating these signals in each radio point 106 reduces the amount of fronthaul bandwidth that is required (since no baseband data needs to be front-hauled for these signals).

In the example shown in FIG. 6, for the Physical Broadcast Channel (PBCH), the downlink Layer-1 signal processing for the LTE wireless interface up to, and including, the scrambling function are performed in the controller 104, whereas the remaining functions (including the modulation and precoding functions) are performed in the radio points 106.

In the example shown in FIG. 6, for the Physical Control Format Indicator Channel (PCFICH) and the Physical Downlink Control Channel (PDCCH), the downlink Layer-1 signal processing for the LTE wireless interface up to, and including, the scrambling function are performed in the controller 104, whereas the remaining functions (including the modulation and precoding functions) are performed in the radio points 106. Also, for the PCFICH and PDCCH, a portion of RE mapping function (determination of where the various bits generated for these channels should be placed in the resource grid) is also performed in the controller 104, where the rest of the RE mapping function is performed in each radio point 106.

In the example shown in FIG. 6, for the Physical Control Hybrid-ARQ Indicator Channel (PHICH), the downlink Layer-1 signal processing for the LTE wireless interface up to, and including, the scrambling and modulation functions are performed in the controller 104, whereas the remaining functions (including the precoding function) are performed in the radio points 106. Also, for the PHICH, a portion of RE mapping function (determination of where the various bits generated for this channel should be placed in the resource grid) is also performed in the controller 104, where the rest of the RE mapping function is performed in each radio point 106. Moreover, the frequency-domain IQ data that is produced in the controller 104 for the PHICH is quantized before being transmitted over the switched Ethernet network 120 in order to compress the baseband data and reduce the amount of fronthaul bandwidth that is used to transmit the baseband data. At each radio point 106, this quantized data is dequantized before precoding is performed. In this example, a lossless quantization scheme is used (for example, one of the lossless quantization schemes described in United States Patent Application No. US 2014/0219162).

In the example shown in FIG. 6, for the Physical Downlink Shared Channel (PDSCH), Machine Type Communication (MTC) Physical Downlink Control Channel (MPDCCH), and MTC Physical Downlink Shared Channel (MPDSCH), the downlink Layer-1 signal processing for the LTE wireless interface up to, and including, the scrambling function for the data to be transmitted and the generation of the associated demodulation reference signal (DMRSs) are performed in the controller 104, whereas the remaining functions (including modulation, layer mapping, and precoding functions) are performed in the radio points 106.

As shown in FIG. 6, the resulting symbols generated for each channel (along with the synchronization and reference signals) are inserted into the LTE resource grid by the resource element (RE) mapping function that is implemented in each RP 106. The resulting symbols generated by the RE mapping function are then converted to time domain IQ data and a cycle prefix (CP) is appended by an Inverse Fast Fourier Transform (iFFT) and CP addition function that is implemented in each RP 106. The resulting time-domain IQ data is then used to generate the corresponding downlink analog RF signals by a Digital-to-RF conversion function that is implemented in each RP 106. In this example, the Digital-to-RF conversion function is implemented in the RF module 182 in each RP 106, whereas the other functions described here in connection with FIG. 6 as being implemented in each RP 106 are implemented using the programmable devices 186 in each RP 106.

Other splits in the wireless-interface processing between the controller 104 and the radio points 106 can be used. Another example is shown in FIG. 7.

Figure 7:
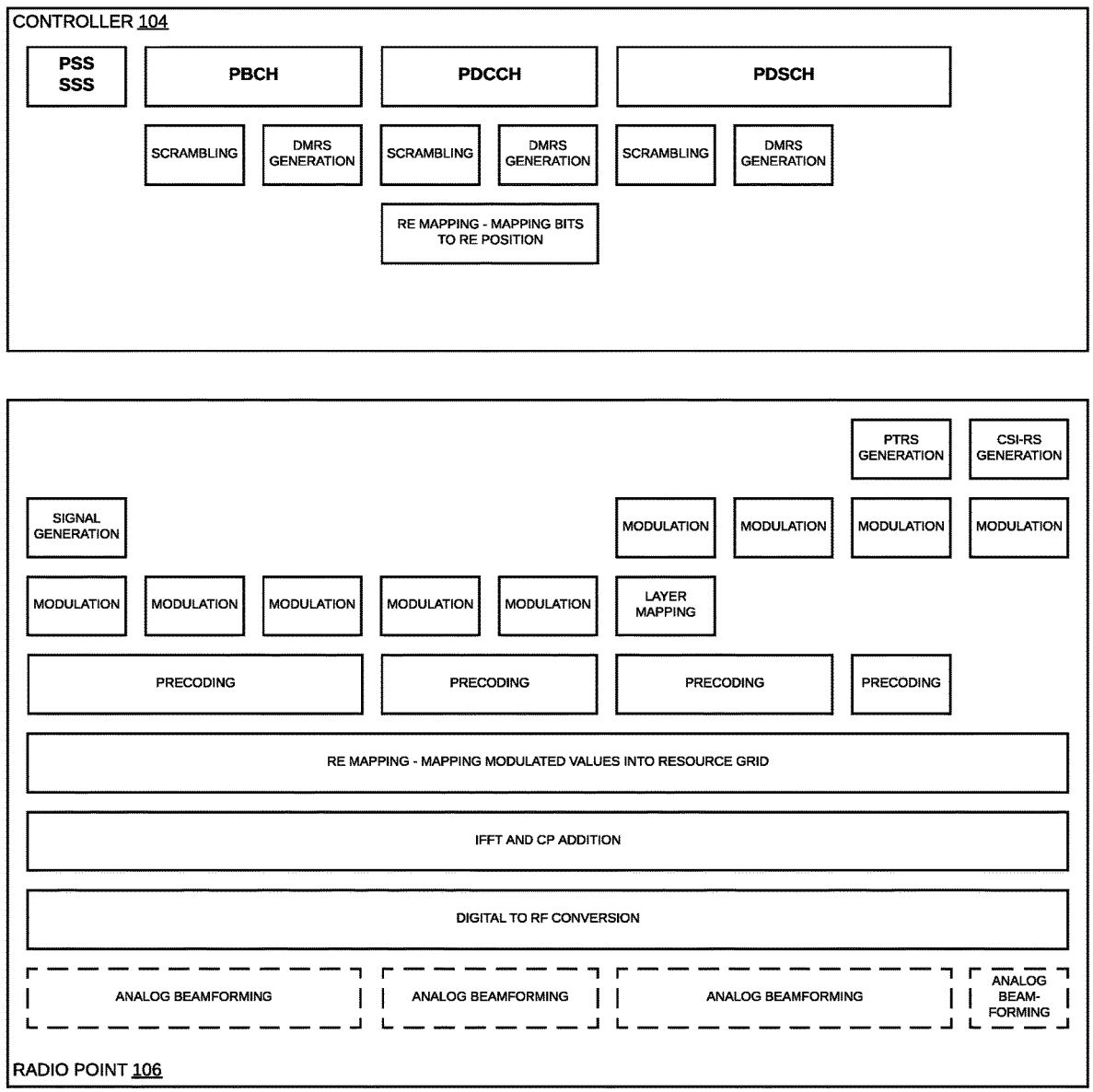
FIG. 7 illustrates one example of the different splits in the wireless-interface processing between the controller and the radio points that can be used for the downlink channels of a Fifth Generation (5G)-New Radio (NR) wireless interface.

FIG. 7 illustrates one example of the different splits in the wireless-interface processing between the controller 104 and the radio points 106 that can be used for the downlink channels of a Fifth Generation (5G)-New Radio (NR) wireless interface. In the example shown in FIG. 7, the serving controller 104 performs the L3 and L2 processing for the wireless interface, whereas different splits in the L1 processing for the wireless interface are used for the different 5G-NR downlink channels.

In the example shown in FIG. 7, downlink Layer-1 signal generation and modulation for the PSS and SSS are performed entirely in the radio points 106. Likewise, in the example shown in FIG. 7, downlink Layer-1 signal generation and modulation for the Phase Tracking Reference Signals (PTRSs) and CSI-RSs are performed entirely in the radio points 106. This is done for the same general reasons described above in connection with FIG. 6.

In the example shown in FIG. 7, for the PBCH, the downlink Layer-1 signal processing for the 5G-NR wireless interface up to, and including, the scrambling function for the data to be transmitted and the generation of the associated DMRSs are performed in the controller 104, whereas the remaining functions (including the modulation and precoding functions) are performed in the radio points 106.

In the example shown in FIG. 7, for the PDCCH, the downlink Layer-1 signal processing for the 5G-NR wireless interface up to, and including, the scrambling function for the data to be transmitted and the generation of the associated DMRSs are performed in the controller 104, whereas the remaining functions (including the modulation and precoding functions) are performed in the radio points 106. Also, for the PDCCH, a portion of RE mapping function (determination of where the various bits generated for this channel should be placed in the resource grid) is also performed in the controller 104, where the rest of the RE mapping function is performed in each radio point 106.

In the example shown in FIG. 7, for the PDSCH, the downlink Layer-1 signal processing for the 5G-NR wireless interface up to, and including, the scrambling function for the data to be transmitted and the generation of the associated DMRSs are performed in the controller 104, whereas the remaining functions (including modulation, layer mapping, and precoding functions) are performed in the radio points 106.

As shown in FIG. 7, the resulting symbols generated for each channel (along with the synchronization and reference signals) are inserted into the 5G-NR resource grid by the RE mapping function that is implemented in each RP 106. The resulting symbols generated by the RE mapping function are then converted to time domain IQ data and a CP is appended by an iFFT and CP addition function that is implemented in each RP 106. The resulting time-domain IQ data is then used to generate the corresponding downlink analog RF signals by a digital-to-RF conversion function that is implemented in each RP 106. Also, any (optional) analog beamforming for any of the channels is also implemented in each RP 106. In this example, the digital-to-RF conversion function and any analog beamforming is implemented in the RF module 182 in each RP 106, whereas the other functions described here in connection with FIG. 7 as being implemented in each RP 106 are implemented using the programmable devices 186 in each RP 106.

Figure 8:
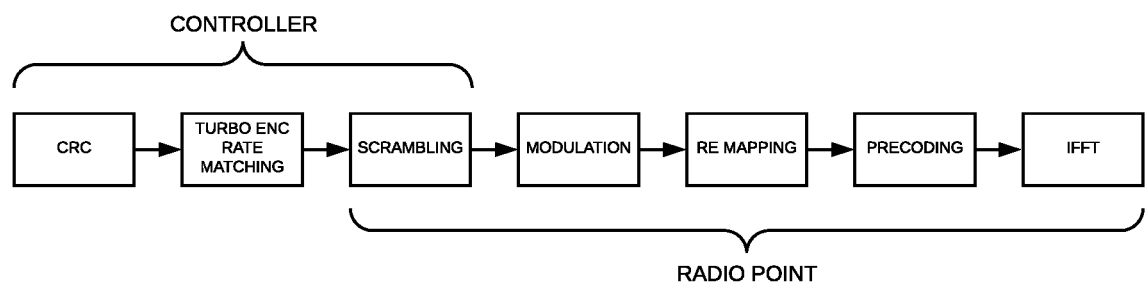
FIG. 8 illustrates another example of a split in the wireless-interface processing between the controller and the radio points that can be used with the PDSCH.

FIG. 8 illustrates another example of a split in the wireless-interface processing between the controller 104 and the radio points 106 that can be used with the PDSCH. This approach is used when both licensed and unlicensed radio frequency spectrum is used to serve a UE 112 in the downlink (for example, by implementing the Licensed Assisted Access (LAA) wireless protocol).

For the licensed RF spectrum, the downlink Layer-1 signal processing for the PDSCH up to, and including, the scrambling function for the data to be transmitted and the generation of the associated DMRSs are performed in the controller 104, whereas the remaining functions (including modulation, layer mapping, and precoding functions) are performed in the radio points 106. However, a different split is used for the unlicensed RF spectrum. This is done because each radio point 106 must separately use the listen before talk (LBT) protocol in order to gain access to the unlicensed RF spectrum. To support the use of the LBT protocol in each radio point 106, for the unlicensed RF spectrum, the downlink Layer-1 signal processing for the PDSCH up to, and including, the cyclic redundancy code (CRC) generation function and the turbo encoding and rate matching function for the data to be transmitted are performed in the controller 104, whereas the remaining functions (including the functions of scrambling the data to be transmitted, generation of the associated DMRSs, modulation, layer mapping, and precoding) are performed in each radio point 106 after the radio point 106 gains access to the unlicensed RF spectrum via the LBT protocol. That is, when PDSCH data is to be transmitted from a radio point 106 using unlicensed RF spectrum, the L2 processing and some of the L1 processing for that data is performed in the controller 104 and the resulting baseband data is sent over the fronthaul 118 to the appropriate radio point 106. The radio point 106 performs the LBT protocol in order to gain access to the unlicensed RF spectrum and, once it is successful, the radio point 106 scrambles the baseband data based on the new transmit (Tx) sub-frame number and performs the rest of the L1 processing as described above.

As noted above, in the example described above, IQ data is communicated between the controller 104 and each radio point 106 over the fronthaul 118 using TLV elements 500.

For example, where the split in the wireless-interface processing between the controller 104 and the radio points 106 for the PDSCH is as described above in FIG. 6, 7, or 8, the controller 104 performs scrambling, CRC addition, code block (CB) segmentation, CB and CRC addition (if applicable), and rate matching. The encoded bits for the resulting codewords (CWs) are communicated from the controller 104 to the appropriate radio points 106 on a per-UE, per-codeword, and per-subframe (a subframe is also known as a "transmission-time-interval" or "TTI") basis using one type of TLV element 500. One example of such a TLV element is shown in FIG. 9. This type of TLV element can also be used when scrambling is performed in the radio points 106 instead of in the controller 104.

FIG. 9 illustrates one exemplary embodiment of a TLV element 900 for communicating downlink IQ data over the fronthaul 118 in the C-RAN 100 described here. This TLV element 900 is also referred to here as the "DL-PDSCH-1CW-FEC_BITS-D" TLV type. This DL-PDSCH-1CW-FEC_BITS-D TLV type is used by the SwIQ-DAP layer 406 for communicating each code word (CW) in the LTE wireless protocol in the PDSCH. In this example, the IQ data (that is, Layer-1 data) is communicated from the controller 104 to the radio points 106 on a per-UE, per-codeword, and per-subframe basis, where the SwIQ-DAP layer 406 in the controller signal processing peer 402 fragments each CW for each UE, codeword, and subframe into segments as needed prior to transmission over the fronthaul 118 and the SwIQ-DAP layer 406 in the radio point signal processing peer 404 re-assembles the received segments. This DL-PDSCH-1CW-FEC_BITS-D TLV type can be used for both MIMO and Transmit Diversity transmission modes. In this example, for each UE 112 wirelessly transmitted to using the PDSCH during each TTI, the IQ data for that UE 112 can be communicated from the controller 104 to the radio points 106 in that UE's simulcast zone using multiple TLV elements 900 that are combined together into a single application-layer PDU, where each resulting application-layer PDU is associated with a single UE. In this example, if the Ethernet Maximum Transmission Unit (MTU) used in the switched Ethernet network 120 is large enough, a single Ethernet packet may carry data for two layers. However, in this example, a single Ethernet packet is used to carry data for two slots if the resulting Ethernet packet has a size that is less than 256 bytes.

Each DL-PDSCH-1CW-FEC_BITS-D TLV element 900 comprises a type field 902 and a length field 904, which comprise the type field 502 and length field 504 as described above in connection with FIG. 5. More specifically, the value stored in the type field 902 is a value indicating that the element 900 is a DL-PDSCH-1CW-FEC_BITS-D TLV element, and the value stored in the length field 904 comprises the length of the particular element 900.

Each DL-PDSCH-1CW-FEC_BITS-D TLV element 900 also comprises a value portion 905 comprising several fields that make up the "value" part of the TLV element 900.

The value portion 905 of the DL-PDSCH-1CW-FEC_BITS-D TLV element 900 comprises a PDU Index/Sequence Number field 906 that is used to store a running number that is the same for all fragments of a given code word. The running number stored in the PDU Index/Sequence Number field 906 is reset for each TTI and is unique for each carrier served by a controller 104. If carrier aggregation is used, this running number is unique for each carrier that is aggregated (even if the various carriers are served by different controllers 104).

The value portion 905 of the DL-PDSCH-1CW-FEC_BITS-D TLV element 900 also comprises a Radio Network Temporary Identifier (RNTI) field 908 that stores the RNTI for the associated CW. The value portion 905 of the DL-PDSCH-1CW-FEC_BITS-D TLV element 900 also comprises a UE Index field 910 that is used to store an index value assigned to the UE for the associated CW. This field 910 can be used by the RP 106 in identifying DL-PDSCH-1CW-FEC_BITS-D TLV elements 900 that are associated with the RNTI. The value portion 905 of the DL-PDSCH-1CW-FEC_BITS-D TLV element 900 also comprises a carrier number field 912 that is used to store an index value assigned to the carrier for the associated CW. This index value is useful when carrier aggregation is used and there is a need to distinguish between the various carriers used to serve a given UE.

In this example, the value portion 905 of the DL-PDSCH-1CW-FEC_BITS-D TLV element 900 also comprises padding 914 and a sub-TLV portion 915. The padding 914 is used so that the sub-TLV portion 915 of each element 900 can be aligned to a preferred boundary. The padding 914 is optional; in other embodiments, padding 914 is not used. The sub-TLV portion 915 of each element 900 comprises one or more sub-TLV elements. In this example, there are two different types of sub-TLV elements. The first type of sub-TLV element 916 is used to communicate the configuration for the associated CW as well as the first segment of encoded bits for the CW. This first type of sub-TLV element 916 is also referred to here as the "PDSCH-CONFIG-and-FEC-BITS" sub-TLV element 916. The second type of sub-TLV element 918 is used to communicate subsequent segments of encoded bits for the CW. This second type of sub-TLV element 918 is also referred to here as the "PDSCH-PADDING-and-FEC-BITS" sub-TLV element 918.

As shown in FIG. 10, the PDSCH-CONFIG-and-FEC-BITS sub-TLV element 916 comprises a sub-TLV type field 922 and a sub-TLV length field 924. The sub-TLV type field 922 stores a value that indicates what type of sub-TLV element that element is, which in this case is a value indicating that the sub-TLV element is a PDSCH-CONFIG-and-FEC-BITS sub-TLV element 916. The sub-TLV length field 924 is used to store the length of that element 916.

The PDSCH-CONFIG-and-FEC-BITS sub-TLV element 916 also comprises a value portion 926. The value portion 926 of the PDSCH-CONFIG-and-FEC-BITS sub-TLV element 916 comprises a downlink channel configuration type field 928 that is used to store a value identifying the configuration of the downlink channel. In this example, the value can indicate whether the downlink channel is configured to use a particular unicast downlink channel transmission mode (for example, transmission mode 4 using transmit diversity, transmission mode 4 using closed loop spatial multiplexing, or transmission mode 9) or is configured as a multicast downlink channel (that, as a Physical Multicast Channel (PMCH)).

The value portion 926 of the PDSCH-CONFIG-and-FEC-BITS sub-TLV element 916 also comprises a UE release field 930 that is used to store a value indicating the UE release (which is used for mapping CSI-RSs and DM-RSs), a modulation order field 932 that is used to store a value indicating the modulation order or scheme to use for the downlink channel, and a PA value field 934 that is used store a value indicating the power of the PDSCH RE in non CS-RS symbols, which can be used to calculate gain values for the PDSCH in the RP 106.

The value portion 926 of the PDSCH-CONFIG-and-FEC-BITS sub-TLV element 916 also comprises a resource allocation type (RAT) field 936 that is used store a value indicating which RAT should be used, a resource block (RB) coding field 938 that is used store a value indicating the RB coding used by the baseband modules in the controller 104 to get the RB allocation for the UE 112, and a scrambling initialization (C-Init) field 940 that is used to store the C-Init value used for scrambling (which is used if scrambling is performed in the radio point 106).

The value portion 926 of the PDSCH-CONFIG-and-FEC-BITS sub-TLV element 916 also comprises a total transport block (TB) length field 942 that is used to store the length of the corresponding transport block after scrambling, a scrambling identifier (SCID) field 944 that is used store the scrambling ID used for UE-specific reference symbols, a DMRS identifier field 946 that is used store a DMRS identifier (which in this example is the same as physical cell identifier unless a different identifier is specified by the higher layers). The values stored in the SCID field 944 and the DMRS identifier field 946 are only used when the downlink channel configuration type field 928 indicates that the downlink channel is configured to use transmission mode 9 (or transmission mode 10 if that mode is also supported).

The value portion 926 of the PDSCH-CONFIG-and-FEC-BITS sub-TLV element 916 also comprises a Multicast Broadcast Single Frequency Network (MBSFN) identifier field 948 that is used to store a MBSFN identifier for the associated UE 112, which is only used when the downlink channel configuration type field 928 indicates that the downlink channel is configured as a multicast downlink channel (PMCH).

The value portion 926 of the PDSCH-CONFIG-and-FEC-BITS sub-TLV element 916 also comprises a number of sub-bands field 950 that is used to store the number of sub-bands that the PDSCH is divided into, a sub-band information field 952 that is used store, for each sub-band, an index value for the precoding matrix or the code book used for precoding of that sub-band, a number of resource blocks (RBs) field 954 that is used to store the number of RBs allocated to the associated UE 112, and a number layers field 956 that is used to store the number of layers on which the downlink channel will be transmitted.

The value portion 926 of the PDSCH-CONFIG-and-FEC-BITS sub-TLV element 916 also comprises a bits field 958 that comprises the actual "payload" for the sub-TLV element 916 and is used to store the bits for the segment of the CW communicated in that sub-TLV element 916. In those embodiments where the scrambling is performed in the controller 104, these bits are scrambled and are forwarded to the modulation function in the RP 106. In those embodiments where the scrambling is performed in the radio point 106, these bits are not scrambled and are forwarded to the scrambling function in the RP 106. The exact size of the bits field 958 varies and depends on factors such as the transport block size and the resource allocation.

Figure 11:
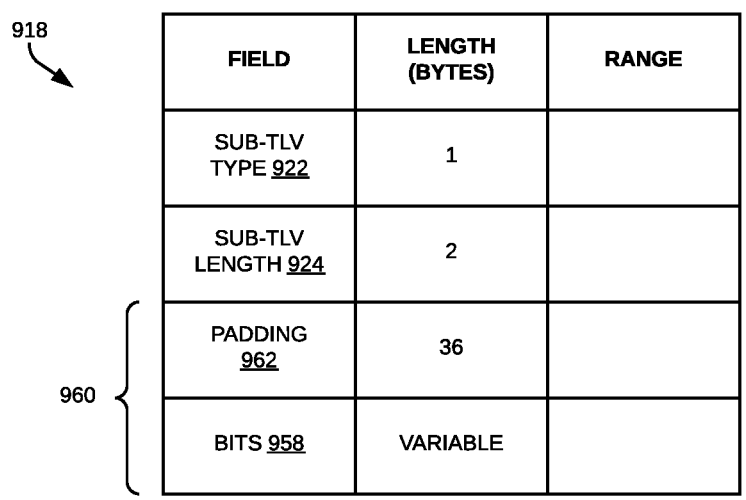
FIG. 11 illustrates one exemplary embodiment of a PDSCH-PADDING-and-FEC-BITS sub-TLV element.

As shown in FIG. 11, each PDSCH-PADDING-and-FEC-BITS sub-TLV elements 918 comprises a sub-TLV type field 922 and a sub-TLV length field 924, which are the same as in the PDSCH-CONFIG-and-FEC-BITS sub-TLV element 916.

Each PDSCH-PADDING-and-FEC-BITS sub-TLV element 918 also comprises a value portion 960 that includes padding 962 and a bits field 958. In this example, the padding 962 is used so that the bits field 958 will be located in the value portion 960 of the PDSCH-PADDING-and-FEC-BITS sub-TLV element 918 at the same offset as the bits field 958 is located in the value portion 926 of the PDSCH-CONFIG-and-FEC-BITS sub-TLV element 916. The bits field 958 of the PDSCH-PADDING-and-FEC-BITS sub-TLV element 918 is used in the same way as the bits field 958 of the PDSCH-CONFIG-and-FEC-BITS sub-TLV element 916.

The TLV elements portrayed in FIGS. 9, 10 and 11 can also be used for transmitting codewords (CVV) of the PDSCH of the 5G-NR wireless protocol using the previously described techniques on a per-UE, per-CW and per-slot basis, where it is understood that the notion of subframe in LTE corresponds to the notion of slot in 5G-NR.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

Example Embodiments

Example 1 includes a system to provide wireless service comprising: at least one controller; and a plurality of radio points; wherein each of the radio points is associated with at least one antenna and remotely located from the controller, wherein the plurality of radio points is communicatively coupled to the controller; wherein the controller and the plurality of radio points are configured to implement at least one base station in order to provide wireless service via a wireless interface to a plurality of user equipment (UEs) using at least one cell; wherein the controller is communicatively coupled to a core network of a wireless service provider; wherein the system is configured so that physical layer processing for the wireless interface is split so that some of the physical layer processing is performed in the controller and some of the physical layer processing is performed in the radio points; and wherein the system is configured so that scrambling of first downlink data to be communicated to a UE over the wireless interface is performed in the controller and so that scrambling of second downlink data to be communicated to said UE over the wireless interface is performed in at least one of the radio points.

Example 2 includes the system of Example 1, wherein the system is configured so that the first downlink data to be communicated to said UE over the wireless interface is communicated to said UE over the wireless interface using licensed radio frequency spectrum.

Example 3 includes the system of any of Examples 1-2, wherein the system is configured so that the second downlink data to be communicated to said UE over the wireless interface is communicated to said UE over the wireless interface using unlicensed radio frequency spectrum.

Example 4 includes the system of Example 3, wherein the system is configured so that the second downlink data is front-hauled from the controller to said one of the radio points in an unscrambled form, wherein the scrambling of the second downlink data to be communicated to said UE over the wireless interface is performed in said one of the radio points after said one of the radio points gains access to the unlicensed radio frequency spectrum.

Example 5 includes the system of Example 4, wherein the system is configured so that said one of the radio points gains access to the unlicensed radio frequency spectrum using a Listen Before Talk (LBT) protocol.

Example 6 includes the system of any of Examples 3-5, wherein the system is configured so that the second downlink data to be communicated to said UE over the wireless interface is communicated to said UE over the wireless interface using unlicensed radio frequency spectrum and Long-Term Evolution (LTE) Licensed Assisted Access (LAA).

Example 7 includes the system of any of Examples 1-6, wherein the system is configured so that the first and second data is front-hauled from the controller to said one of the radio points in a common format, wherein the common format supports communicating information needed for performing the scrambling of the second downlink data in said one of the radio points.

Example 8 includes the system of any of Examples 1-7, wherein the system is configured so that the common format comprises one or more type-length-value (TLV) elements.

Example 9 includes the system of Example 8, wherein the system is configured so that each TLV element can comprise one or more sub-TLV elements, one sub-TLV element comprising configuration information and bits for the data to be communicated over the wireless interface, the configuration information including the information need for performing the scrambling of the second downlink data in said one of the radio points.

Example 10 includes the system of any of Examples 1-9, wherein the system is configured to fronthaul data between the controller and the radio points using a switched Ethernet network.

Example 11 includes the system of Example 10, wherein the system is configured to fronthaul data between the controller and the radio points using a protocol stack comprising an application layer, an Internet Protocol (IP) layer, and an Ethernet layer; wherein the application layer is configured in order to enable fronthaul data to be associated with an application-layer multicast address; wherein the IP layer is configured in order to enable fronthaul data to be associated with an IP multicast address; and wherein the application layer is configured so that the application-layer multicast address indicates which radio points the associated fronthaul data is intended for.

Example 12 includes the system of Example 11, wherein the application layer is configured so that the application-layer multicast address indicates which radio points the associated fronthaul data is intended for if the respective IP multicast address associated with that fronthaul data includes radio points other than the radio points that fronthaul data is intended for.

Example 13 includes the system of any of Examples 11-12, wherein the system is configured to dynamically create IP multicast groups based on respective subsets of the radio points used to communicate data to the UEs; and wherein the system is configured so that the IP multicast groups include one IP multicast group that includes all of the radio points.

Example 14 includes a system to provide wireless service comprising: at least one controller; and a plurality of radio points; wherein each of the radio points is associated with at least one antenna and remotely located from the controller, wherein the plurality of radio points is communicatively coupled to the controller; wherein the controller and the plurality of radio points are configured to implement at least one base station in order to provide wireless service via a Long-Term Evolution (LTE) wireless interface to a plurality of user equipment (UEs) using at least one cell; wherein the controller is communicatively coupled to a core network of a wireless service provider; wherein the system is configured so that physical layer processing for the wireless interface is split so that some of the physical layer processing is performed in the controller and some of the physical layer processing is performed in the radio points; and wherein the system is configured so that: signal generation and modulation for Primary Synchronization Signals (PSS) and Secondary Synchronization Signals (SSS) are performed entirely in the radio points; signal generation and modulation for Cell-Specific Reference Signals (CS-RSs) and Channel State Information Reference Signals (CSI-RSs) are performed entirely in the radio points; for a Physical Downlink Control Channel (PDCCH), downlink Layer-1 signal processing for the LTE wireless interface up to, and including, a scrambling function is performed in the controller, wherein a portion of a resource element (RE) mapping function for the PDCCH is also performed in the controller, wherein the downlink Layer-1 signal processing for the PDCCH not performed in the controller is performed in the radio points; and for a Physical Downlink Shared Channel (PDSCH), downlink Layer-1 signal processing for the LTE wireless interface up to, and including, a scrambling function for data to be transmitted and generation of associated demodulation reference signals (DMRSs) are performed in the controller, wherein the downlink Layer-1 signal processing for the PDSCH not performed in the controller is performed in the radio points.

Example 15 includes the system of Example 14, wherein the system is further configured so that: for a Physical Broadcast Channel (PBCH), downlink Layer-1 signal processing for the LTE wireless interface up to, and including, a scrambling function is performed in the controller, wherein the downlink Layer-1 signal processing for the PBCH not performed in the controller is performed in the radio points.

Example 16 includes the system of any of Examples 14-15, wherein the system is further configured so that: for a Physical Control Format Indicator Channel (PCFICH), downlink Layer-1 signal processing for the LTE wireless interface up to, and including, a scrambling function is performed in the controller, wherein a portion of a resource element (RE) mapping function for the PCFICH is also performed in the controller, wherein the downlink Layer-1 signal processing for the PCFICH not performed in the controller is performed in the radio points.

Example 17 includes the system of Example 16, wherein the system is configured so that the data produced in the controller for the PHICH is quantized to produce quantized data, wherein the quantized data is communicated to the radio points, wherein the radio points dequantize the quantized data before the downlink Layer-1 signal processing for the PCFICH not performed in the controller.

Example 18 includes the system of any of Examples 14-17, wherein the system is further configured so that: for a Machine Type Communication (MTC) Physical Downlink Control Channel (MPDCCH), downlink Layer-1 signal processing for the LTE wireless interface up to, and including, a scrambling function for data to be transmitted and generation of associated DMRSs are performed in the controller, wherein the downlink Layer-1 signal processing for the MPDCCH not performed in the controller is performed in the radio points; and for a MTC Physical Downlink Shared Channel (MPDSCH), downlink Layer-1 signal processing for the LTE wireless interface up to, and including, a scrambling function for data to be transmitted and generation of associated DMRSs are performed in the controller, wherein the downlink Layer-1 signal processing for the MPDSCH not performed in the controller is performed in the radio points.

Example 19 includes the system of any of Examples 14-18, wherein the system is configured so that data is front-hauled from the controller to said one of the radio points using type-length-value (TLV) elements in which different types of data can be communicated.

Example 20 includes the system of any of Examples 14-19, wherein the system is configured to fronthaul data between the controller and the radio points using a switched Ethernet network.

Example 21 includes the system of any of Examples 14-20, wherein the system is configured to fronthaul data between the controller and the radio points using a protocol stack comprising an application layer, an Internet Protocol (IP) layer, and an Ethernet layer; wherein the application layer is configured in order to enable fronthaul data to be associated with an application-layer multicast address; wherein the IP layer is configured in order to enable fronthaul data to be associated with an IP multicast address; and wherein the application layer is configured so that the application-layer multicast address indicates which radio points the associated fronthaul data is intended for.

Example 22 includes the system of any of Examples 14-21, wherein the application layer is configured so that the application-layer multicast address indicates which radio points the associated fronthaul data is intended for if the respective IP multicast address associated with that fronthaul data includes radio points other than the radio points that fronthaul data is intended for.

Example 23 includes the system of any of Examples 21-22, wherein the system is configured to dynamically create IP multicast groups based on respective subsets of the radio points used to communicate data to the UEs; and wherein the system is configured so that the IP multicast groups include one IP multicast group that includes all of the radio points.

Example 24 includes the system of any of Examples 14-23, wherein a portion of a RE mapping function for at least one physical downlink channel is performed in the radio points.

Example 25 includes the system of any of Examples 14-24, wherein the system is configured to fronthaul Layer-1 data between the controller and at least some of the radio points on a per-subframe basis.

Example 26 includes the system of any of Examples 14-25, wherein the system is configured to fronthaul Layer-1 data between the controller and at least some of the radio points on a per-codeword basis.

Example 27 includes the system of any of Examples 14-26, wherein the system is configured, for each UE wirelessly transmitted to using the PDSCH during each subframe, to fronthaul Layer-1 data for that UE from the controller to at least some of the radio points in a single application-layer protocol data unit.

Example 28 includes system to provide wireless service comprising: at least one controller; and a plurality of radio points; wherein each of the radio points is associated with at least one antenna and remotely located from the controller, wherein the plurality of radio points is communicatively coupled to the controller; wherein the controller and the plurality of radio points are configured to implement at least one base station in order to provide wireless service via a Fifth Generation New Radio (5G-NR) wireless interface to a plurality of user equipment (UEs) using at least one cell; wherein the controller is communicatively coupled to a core network of a wireless service provider; wherein the system is configured so that physical layer processing for the wireless interface is split so that some of the physical layer processing is performed in the controller and some of the physical layer processing is performed in the radio points; and wherein the system is configured so that: signal generation and modulation for Primary Synchronization Signals (PSS) and Secondary Synchronization Signals (SSS) are performed entirely in the radio points; signal generation and modulation for Phase Tracking Reference Signals (PTRSs) and Channel State Information Reference Signals (CSI-RSs) are performed entirely in the radio points; for a Physical Downlink Control Channel (PDCCH), downlink Layer-1 signal processing for the 5G-NR wireless interface up to, and including, a scrambling function for data to be transmitted and generation of associated demodulation reference signals (DMRSs) are performed in the controller, wherein a portion of a resource element (RE) mapping function for the PDCCH is also performed in the controller, wherein the downlink Layer-1 signal processing for the PDCCH not performed in the controller is performed in the radio points; and for a Physical Downlink Shared Channel (PDSCH), downlink Layer-1 signal processing for the 5G-NR wireless interface up to, and including, a scrambling function for data to be transmitted and generation of associated DMRSs are performed in the controller, wherein the downlink Layer-1 signal processing for the PDSCH not performed in the controller is performed in the radio points.

Example 29 includes the system of Example 28, wherein the system is further configured so that: for a Physical Broadcast Channel (PBCH), downlink Layer-1 signal processing for the 5G-NR wireless interface up to, and including, a scrambling function for data to be transmitted and generation of associated DMRSs are performed in the controller, wherein the downlink Layer-1 signal processing for the PBCH not performed in the controller is performed in the radio points.

Example 30 includes the system of any of Examples 28-29, wherein the system is configured so that data is front-hauled from the controller to said one of the radio points using type-length-value (TLV) elements in which different types of data can be communicated.

Example 31 includes the system of any of Examples 28-30, wherein the system is configured to fronthaul data between the controller and the radio points using a switched Ethernet network.

Example 32 includes the system of any of Examples 28-31, wherein the system is configured to fronthaul data between the controller and the radio points using a protocol stack comprising an application layer, an Internet Protocol (IP) layer, and an Ethernet layer; wherein the application layer is configured in order to enable fronthaul data to be associated with an application-layer multicast address; wherein the IP layer is configured in order to enable fronthaul data to be associated with an IP multicast address; and wherein the application layer is configured so that the application-layer multicast address indicates which radio points the associated fronthaul data is intended for.

Example 33 includes the system of Example 32, wherein the application layer is configured so that the application-layer multicast address indicates which radio points the associated fronthaul data is intended for if the respective IP multicast address associated with that fronthaul data includes radio points other than the radio points that fronthaul data is intended for.

Example 34 includes the system of any of Examples 32-33, wherein the system is configured to dynamically create IP multicast groups based on respective subsets of the radio points used to communicate data to the UEs; and wherein the system is configured so that the IP multicast groups include one IP multicast group that includes all of the radio points.

Example 35 includes the system of any of Examples 28-34, wherein a portion of a RE mapping function for at least one physical downlink channel is performed in the radio points.

Example 36 includes the system of any of Examples 28-35, wherein the system is configured to fronthaul Layer-1 data between the controller and at least some of the radio points on a per-slot basis.

Example 37 includes the system of any of Examples 28-36, wherein the system is configured to fronthaul Layer-1 data between the controller and at least some of the radio points on a per-codeword basis.

Example 38 includes the system of any of Examples 28-37, wherein the system is configured, for each UE wirelessly transmitted to using the PDSCH during each slot, to fronthaul Layer-1 data for that UE from the controller to at least some of the radio points in a single application-layer protocol data unit.

What is claimed is:
1. A system comprising:
a plurality of baseband units; and
a shared radio point that is communicatively coupled to the plurality of baseband units using a fronthaul network and that is configured to serve each of the plurality of baseband units;
wherein the shared radio point is configured to perform at least some Layer 1 processing for implementing a respective base station for each of the plurality of baseband units;
wherein the plurality of baseband units communicates fronthaul data to the shared radio point using a shared fronthaul network;
wherein the system is configured to communicate at least two different types of fronthaul data from the plurality of baseband units to the shared radio point using a single application-layer protocol that supports at least two types of elements, wherein each of the at least two types of elements is configured for a respective one of the at least two different types of fronthaul data; and
wherein the system is configured so at least some of the elements communicated using the application-layer protocol include one or more sub-elements, each sub-element comprising a type field, a length field, and a value portion.

2. The system of claim 1, wherein the system is configured so that the application-layer protocol supports application-layer fragmentation of fronthaul data into multiple segments.

3. The system of claim 2, wherein the system is configured so that each segment includes a field storing a value that is used to identify segments that are fragments of a common whole.

4. The system of claim 2, wherein the system is configured to communicate messages from the plurality of baseband units to the shared radio point using the application-layer protocol, wherein each of the messages comprises a field storing a value indicating the number of elements stored in the message.

5. The system of claim 4, wherein the system is configured so that the field storing the value indicating the number of elements stored in each message is a part of an application header portion of the message.

6. The system of claim 1, wherein the system is configured so at least some of the elements communicated using the application-layer protocol include a description of a range of resource blocks (RB) for which frequency-domain in-phase and quadrature (IQ) data is communicated using the application-layer protocol.

7. The system of claim 1, wherein the system is configured so that protocol data units for the application-layer protocol are encapsulated into Ethernet frames.

8. The system of claim 7, wherein the protocol data units for the application-layer protocol are encapsulated into Ethernet frames by first encapsulating the protocol data units using a second layer.

9. A shared radio point for use in a radio access network (RAN), the shared radio point comprising:
at least one network interface to communicative couple the shared radio point to a plurality of baseband units using a fronthaul network;
at least one programmable device configured to perform at least some Layer 1 processing for implementing a respective base station for each of the plurality of baseband units; and
a plurality of radio frequency (RF) modules to implement RF transceiver functions for the baseband units;
wherein the shared radio point is configured to serve each of the plurality of baseband units;
wherein the shared radio point is configured to receive fronthaul data from the plurality of baseband units;
wherein the shared radio point is configured to receive at least two different types of fronthaul data from the plurality of baseband units using a single application-layer protocol that supports at least two types of elements, wherein each of the at least two types of elements is configured for a respective one of the at least two different types of fronthaul data; and
wherein the shared radio point is configured so at least some of the elements received using the application-layer protocol include one or more sub-elements, each sub-element comprising a type field, a length field, and a value portion.

10. The shared radio point of claim 9, wherein the shared radio point is configured so that the application-layer protocol supports application-layer fragmentation of fronthaul data into multiple segments.

11. The shared radio point of claim 10, wherein the shared radio point is configured so that each segment includes a respective field storing a value that is used to identify segments that are fragments of a common whole.

12. The shared radio point of claim 10, wherein the shared radio point is configured to receive messages from the plurality of baseband units using the application-layer protocol, wherein each of the messages comprises a field storing a value indicating the number of elements stored in the message.

13. The shared radio point of claim 12, wherein the shared radio point is configured so that the field storing the value indicating the number of elements stored in each message is a part of an application header portion of the message.

14. The shared radio point of claim 9, wherein the shared radio point is configured so at least some of the elements received using the application-layer protocol include a description of a range of resource blocks (RB) for which frequency-domain in-phase and quadrature (IQ) data is received using the application-layer protocol.

15. The shared radio point of claim 9, wherein the shared radio point is configured so that protocol data units for the application-layer protocol are encapsulated into Ethernet frames.

16. The shared radio point of claim 15, wherein the shared radio point is configured so that the protocol data units for the application-layer protocol are encapsulated into Ethernet frames by first encapsulating the protocol data units using a second layer.

17. A method for a shared radio point, the method comprising:
communicatively coupling the shared radio point to the plurality of baseband units using a shared fronthaul network;
performing, by the shared radio point, at least some Layer 1 processing for implementing a respective base station for each of the plurality of baseband units; and
receiving, by the shared radio point, fronthaul data from the plurality of baseband units; and
wherein receiving, by the shared radio point, the fronthaul data from the plurality of baseband units comprises:
receiving, by the shared radio point, at least two different types of fronthaul data from the plurality of baseband units using a single application-layer protocol that supports at least two types of elements, wherein each of the at least two types of elements is configured for a respective one of the at least two different types of fronthaul data, and wherein at least some of the elements received using the application-layer protocol include one or more sub-elements, each sub-element comprising a type field, a length field, and a value portion.

18. The method of claim 17, further comprising: fragmenting, by the application-layer protocol, fronthaul data into multiple segments.

19. The method of claim 18, wherein each segment includes a respective field storing a value that is used to identify segments that are fragments of a common whole.

20. The method of claim 18, wherein receiving, by the shared radio point, the fronthaul data from the plurality of baseband units comprises:
receiving, by the shared radio point, messages from the plurality of baseband units using the application-layer protocol, wherein each of the messages comprises a field storing a value indicating the number of elements stored in the message.

21. The method of claim 20, wherein the field storing the value indicating the number of elements stored in each message is a part of an application header portion of the message.

22. The method of claim 17, wherein at least some of the elements received using the application-layer protocol include a description of a range of resource blocks (RB) for which frequency-domain in-phase and quadrature (IQ) data is received using the application-layer protocol.

23. The method of claim 17, further comprising encapsulating protocol data units for the application-layer protocol into Ethernet frames.

24. The method of claim 23, wherein encapsulating the protocol data units for the application-layer protocol into the Ethernet frames comprises first encapsulating the protocol data units using a second layer.

* * * * *